(12) United States Patent
Bass et al.

(10) Patent No.: US 10,698,286 B2
(45) Date of Patent: Jun. 30, 2020

(54) ELECTROCHROMIC MULTI-LAYER DEVICES WITH CHARGE SEQUESTRATION AND RELATED METHODS

(71) Applicant: Kinestral Technologies, Inc., South San Francisco, CA (US)

(72) Inventors: John David Bass, South San Francisco, CA (US); Jonathan Ziebarth, South San Francisco, CA (US); Hugues Duncan, South San Francisco, CA (US); Justin Kerszulis, South San Francisco, CA (US); Howard W. Turner, South San Francisco, CA (US); Jeffrey Charles Yoder, South San Francisco, CA (US)

(73) Assignee: KINESTRAL TECHNOLOGIES, INC., Hayward, CA (US)

( * ) Notice: Subject to any disclaimer, the term of this patent is extended or adjusted under 35 U.S.C. 154(b) by 0 days.

(21) Appl. No.: 16/017,901

(22) Filed: Jun. 25, 2018

(65) Prior Publication Data
US 2018/0307113 A1  Oct. 25, 2018

Related U.S. Application Data

(63) Continuation of application No. 15/424,591, filed on Feb. 3, 2017, now Pat. No. 10,007,163, which is a (Continued)

(51) Int. Cl.
*G02F 1/15* (2019.01)
*G02F 1/1503* (2019.01)
(Continued)

(52) U.S. Cl.
CPC .......... *G02F 1/1503* (2019.01); *E06B 3/6722* (2013.01); *E06B 9/24* (2013.01); *G02F 1/153* (2013.01); *G02F 1/155* (2013.01); *G02F 1/163* (2013.01); *E06B 2009/2464* (2013.01); *G02F 1/1523* (2013.01); *G02F 1/15165* (2019.01); *G02F 2001/15145* (2019.01)

(58) Field of Classification Search
CPC ........ G02F 1/1503; G02F 1/153; G02F 1/163; G02F 1/155; G02F 2001/15145; G02F 1/15165; G02F 1/1523; E06B 9/24; E06B 3/6722; E06B 2009/2464
USPC ......................................................... 359/275
See application file for complete search history.

(56) References Cited

U.S. PATENT DOCUMENTS

2019/0145161 A1* 5/2019 Agrawal ................... G02F 1/15

* cited by examiner

*Primary Examiner* — Tuyen Tra
(74) *Attorney, Agent, or Firm* — Womble Bond Dickinson (US) LLP

(57) ABSTRACT

An electrochromic multi-layer stack is provided. The multi-layer stack includes an electrochromic multi-layer stack having a first substrate, a first electrically conductive layer, a first electrode layer, an ion conductor layer, a second substrate, a second electrically conductive layer, and a second electrode layer. The multi-layer stack includes a redox element, wherein the redox element is electrically isolated from the first and second electrically conductive layers and the first and second electrode layer and is laterally adjacent to either the first electrically conductive layer and the first electrode, or the second electrically conductive layer and the second electrode layer. A method for controlling an electrochromic device is also provided.

20 Claims, 9 Drawing Sheets

Related U.S. Application Data continuation of application No. 14/994,087, filed on Jan. 12, 2016, now Pat. No. 9,581,877.

(60) Provisional application No. 62/170,429, filed on Jun. 3, 2015, provisional application No. 62/102,417, filed on Jan. 12, 2015, provisional application No. 62/102,409, filed on Jan. 12, 2015.

(51) Int. Cl.
| | |
|---|---|
| *G02F 1/155* | (2006.01) |
| *G02F 1/163* | (2006.01) |
| *G02F 1/153* | (2006.01) |
| *E06B 3/67* | (2006.01) |
| *E06B 9/24* | (2006.01) |
| G02F 1/1516 | (2019.01) |
| G02F 1/1514 | (2019.01) |
| G02F 1/1523 | (2019.01) |

Passive Embodiment 1

Passive Embodiment 2

Active Embodiment

Enhanced Active

Organic Embodiment 1

Organic Embodiment 2

Organic Embodiment 3

ELECTROCHROMIC MULTI-LAYER DEVICES WITH CHARGE SEQUESTRATION AND RELATED METHODS

FIELD OF THE INVENTION

The present disclosure generally relates to electrochromic devices, such as mirrors or windows, configured to cycle between optically less and more transmissive states and comprising a redox element configured to be selectively oxidized or reduced in a redox reaction in response to an electrical potential applied to the electrochromic device.

BACKGROUND OF THE INVENTION

Electrochromic devices typically utilize a combination of two types of electrochromic materials, one of which becomes optically less transmissive (e.g., takes on color) in its electrochemically oxidized state while the other becomes optically less transmissive (e.g., takes on color) in its electrochemically reduced state. For example, Prussian blue assumes a blue color in its electrochemically oxidized state and becomes colorless by reduction while tungsten trioxide $WO_3$, assumes a blue color in its electrochemically reduced state and becomes colorless by oxidation. When the two are used as separate electrochromic layers separated by an ion conductor layer in a multi-layer stack, the stack may be reversibly cycled between a blue color (when the Prussian blue material is in its electrochemically oxidized state and tungsten trioxide is in its reduced state) and a transparent state (when the Prussian blue material is in its electrochemically reduced state and tungsten trioxide is in its electrochemically oxidized state) by application of an appropriate voltage across the stack.

Faradaic losses in reversible electrochromic devices can degrade the performance of reversible electrochromic devices. For example, a faradaic loss may be caused during cycling by a reaction between the electrolyte and an oxidizing electrode surface, by a photochemical oxidation reaction, or by any of a range of other spurious oxidation mechanisms involving water, oxygen, and/or a component of an ion conducting material (e.g., an ion conductor layer). These faradaic losses can, in turn, result in a corresponding change in the oxidation state of an electrochromic material in the electrochromic device. The faradaic losses can occur in the electrochromic material that becomes optically less transmissive in its electrochemically oxidized state, the electrochromic material that becomes optically less transmissive in its electrochemically reduced state, or both. Over time and repeated cycling, the accumulated faradaic losses can cause a drift in the range of optical transmissivities achievable for the device within the desired operating voltage range for the device.

In certain types of electrochromic devices, durability is a major challenge. As the device ages the performance suffers. The transmission in the colored and bleached states can change, the capacity (charge stored in the device in a given state) can change, and the ratio of the transmittance of the device in the bleached state versus the colored state over the visible range of the electromagnetic spectrum can also change. These changes can be large, and easily perceptible to the user of the electrochromic device. The rates of degradation can also be affected by many factors, including but not limited to temperature, applied bias ranges, rate of switching, and intensity and duration of incident solar radiation.

What is therefore desired are electrochromic device architectures, materials, and control schemes that enable an electrochromic device with faradaic losses (i.e., spurious oxidation and/or reduction) to maintain the electrochromic properties throughout the lifetime of the device. Furthermore, the device architectures, materials and control schemes employed should be able to be readily manufacturable into commercially viable products.

SUMMARY

The present disclosure describes an electrochromic (EC) device comprising a redox element, where the redox element sequesters charge from one or more layers comprising the electrochromic device. In some cases, the redox element sequesters charge to mitigate or prevent performance degradation of the electrochromic device resulting from faradic losses. In some cases, the redox element sequesters charge to mitigate or prevent a decrease in the photopic ratio of the electrochromic device.

Other embodiments of the disclosure include an electrochromic device having a redox element comprising sequestration material and a multi-layer stack configured to receive a first electrical potential and capable of reversibly cycling between an optically less transmissive state and an optically more transmissive state in response to the first electrical potential being applied to the multi-layer stack. The multi-layer stack includes, in succession, a first electrically conductive layer, a first electrode layer electrically coupled to the first electrically conductive layer and having a first electrode material, an ion conductor layer, a second electrode layer having a second electrode material, and a second electrically conductive layer electrically coupled to the second electrode layer. The first electrode material and/or the second electrode material include an electrochromic material. The redox element can be selectively oxidized or reduced in a redox reaction in response to a second electrical potential being applied to the redox element. Further, the electrochromic device includes one or more electric power supplies, the electric power supply/supplies is/are configured to provide the first electrical potential to the multi-layer stack, and the electric power supply/supplies is/are configured to provide the second electrical potential to the multi-layer stack to selectively oxidize or reduce the redox element.

Other embodiments of the disclosure include an electrochromic device having a redox element comprising an organic sequestration material mixed with, or incorporated in, the ion conductor material and a multi-layer stack configured to receive a first electrical potential and capable of reversibly cycling between an optically less transmissive state and an optically more transmissive state in response to the first electrical potential being applied to the multi-layer stack. The multi-layer stack includes, in succession, a first electrically conductive layer, a first electrode layer electrically coupled to the first electrically conductive layer and having a first electrode material, an ion conductor layer, a second electrode layer having a second electrode material, and a second electrically conductive layer electrically coupled to the second electrode layer. The first electrode material and/or the second electrode material include an electrochromic material. The redox element can be selectively oxidized or reduced in a redox reaction in response to a second electrical potential being applied to the redox element. Further, the electrochromic device includes one or more electric power supplies, the electric power supply/supplies is/are configured to provide the first electrical potential to the multi-layer stack, and the electric power supply/supplies is/are configured to provide the second electrical potential to the multi-layer stack to selectively oxidize or reduce the redox element.

Other embodiments of the disclosure include an electrochromic device having a redox element comprising an auxiliary electrode and a multi-layer stack configured to receive a first electrical potential and capable of reversibly cycling between an optically less transmissive state and an optically more transmissive state in response to the first electrical potential being applied to the multi-layer stack. In some embodiments, the redox element comprises an auxiliary electrode and a sequestration material. In some embodiments, the redox element comprises an auxiliary electrode and an organic sequestration material mixed with, or incorporated in, the ion conductor material. The multi-layer stack includes, in succession, a first electrically conductive layer, a first electrode layer electrically coupled to the first electrically conductive layer and having a first electrode material, an ion conductor layer, a second electrode layer having a second electrode material, and a second electrically conductive layer electrically coupled to the second electrode layer. The first electrode material and/or the second electrode material include an electrochromic material. The redox element can be selectively oxidized or reduced in a redox reaction in response to a second electrical potential being applied to the redox element. Further, the electrochromic device includes one or more electric power supplies, the electric power supply/supplies is/are configured to provide the first electrical potential to the multi-layer stack, and the electric power supply/supplies is/are configured to provide the second electrical potential to the auxiliary electrode of the redox element to selectively oxidize or reduce the redox element.

In some further embodiments of the disclosure, the electrochromic device includes data analysis and control electronics configured to determine when the second electrical potential is applied to the redox element.

Other embodiments of the disclosure include a method of manufacturing an electrochromic device. In some embodiments, the method includes providing a redox element and providing a multi-layer stack configured to receive a first electrical potential and capable of reversibly cycling between an optically less transmissive state and an optically more transmissive state in response to the first electrical potential being applied to the multi-layer stack. In some embodiments, the method includes providing a redox element comprising a sequestration material or an organic sequestration material, and providing a multi-layer stack configured to receive a first electrical potential and capable of reversibly cycling between an optically less transmissive state and an optically more transmissive state in response to the first electrical potential being applied to the multi-layer stack. In some embodiments, the method includes providing a redox element comprising an auxiliary electrode, and optionally comprising a sequestration material or an organic sequestration material, and providing a multi-layer stack configured to receive a first electrical potential and capable of reversibly cycling between an optically less transmissive state and an optically more transmissive state in response to the first electrical potential being applied to the multi-layer stack. The multi-layer stack includes, in succession, a first electrically conductive layer, a first electrode layer electrically coupled to the first electrically conductive layer and having a first electrode material, an ion conductor layer, a second electrode layer having a second electrode material, and a second electrically conductive layer electrically coupled to the second electrode layer. The first electrode material and/or the second electrode material include an electrochromic material. The redox element can be selectively oxidized or reduced in a redox reaction in response to a second electrical potential being applied to the redox element.

BRIEF DESCRIPTION OF THE DRAWINGS

To facilitate further description of the embodiments, the following drawings are provided in which.

Figure 1:
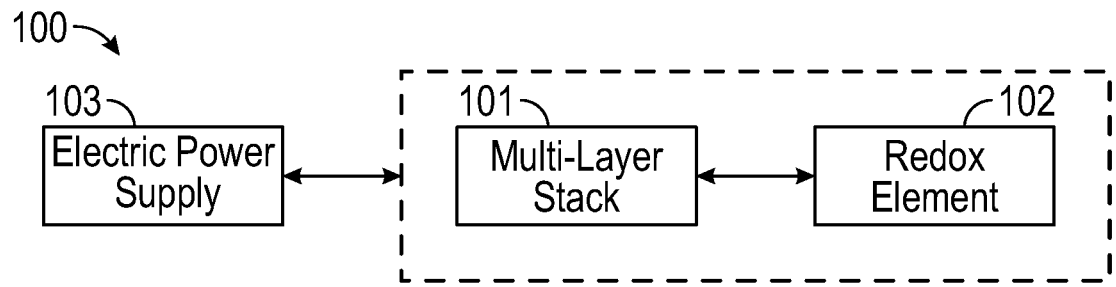
FIG. 1 is a block diagram of an electrochromic device.

Corresponding reference characters indicate corresponding parts throughout the drawings. Additionally, relative thicknesses of the layers in the different figures do not represent the true relationship in dimensions. For example, the substrates are typically much thicker than the other layers. The figures are drawn only for the purpose to illustrate connection principles, not to give any dimensional information.

Abbreviations and Definitions

The following definitions are provided to better define the embodiments of the present disclosure and to guide those of ordinary skill in the art in the practice of the present disclosure. Unless otherwise noted, terms are to be understood according to conventional usage by those of ordinary skill in the relevant art.

The term "anodic electrochromic material" refers to an electrochromic material that changes from a less optically transmissive state to a less optically transmissive state (e.g., darkens) upon oxidation (i.e., removal of electrons).

The term "cathodic electrochromic material" refers to an electrochromic material that changes from a less optically transmissive state to a more optically transmissive state (e.g., darkens) upon reduction (i.e., addition of electrons).

The term "electrochromic material" refers to a material that is able to change its optical properties as a result of the insertion or extraction of ions and electrons. For example, an electrochromic material may change between (i) a colored, translucent or opaque state and a transparent state or (ii) a colored, opaque state and a colored, translucent state. In some examples, the change can be reversible while in other examples, the change can be irreversible.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that an activity, process, method, system, article, device, or apparatus that comprises a list of elements is not necessarily limited to those elements, but may include other elements not expressly listed or inherent to such activity, process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the disclosure described herein are, for example, capable of operation in other orientations than those illustrated or otherwise described herein.

The terms "couple," "coupled," "couples," "coupling," and the like should be broadly understood and refer to connecting two or more elements or signals, electrically, ionically, mechanically and/or otherwise. Two or more electrical elements may be electrically coupled but not be mechanically or otherwise coupled; two or more mechanical elements may be mechanically coupled, but not be electrically or otherwise coupled; two or more electrical elements may be mechanically coupled, but not be electrically or otherwise coupled. Coupling may be for any length of time (e.g., permanent or semi-permanent or only for an instant).

"Electrical coupling" and the like should be broadly understood and include coupling involving any electrical signal, whether a power signal, a data signal, and/or other types or combinations of electrical signals.

"Ionic coupling" and the like should be broadly understood and include coupling involving or permitting the transfer of ions between discrete layers or compositions.

"Mechanical coupling" and the like should be broadly understood and include mechanical coupling of all types.

The absence of the word "removably," "removable," and the like near the word "coupled," and the like does not mean that the coupling, etc. in question is or is not removable.

For convenience of description herein, change of the one or more optical properties of electrochromic devices (i.e., switching or cycling of the electrochromic devices) is primarily discussed as occurring between a pair of optical states (i.e., an optically less transmissive state and an optically more transmissive state), but it should be understood that these are merely examples and relative terms. For example, the optically less and more transmissive states can be a pair of optical states between a pair of more extreme optically less and more transmissive states that are attainable by a specific electrochromic device. Further, there could be any number of optical states between the optically less and more transmissive states.

There are different metrics for the optical and electrical performance of an electrochromic window. In the more transmissive state, or bleached state, the transmission in the visible spectrum is a key metric. In some cases the transmission across the visible spectrum can be weighted by the spectral sensitivity of the human eye, and is referred to in this disclosure as "Tvis". A figure of merit for the transmission is the percent transmission at 550 nm, which is close to the peak response of the human eye, and is referred to in this disclosure as "T550". The transmittance of the device in the less transmissive state, or colored state, is also an important metric.

The "photopic transmittance ratio" (i.e. the "photopic ratio") is the transmittance of device in the bleached state divide by the transmittance of device in colored state over the visible range of the electromagnetic spectrum (e.g., wavelengths of electromagnetic radiation greater than or equal to approximately 380 nanometers and less than or equal to approximately 780 nanometers), weighted by a photopic sensitivity curve (i.e., an average sensitivity of a human eye).

The photopic transmittance ratio can refer to the transmittance of multi-layer stack 101 in the more optically transmissive state versus the less optically transmissive state over the visible range of the electromagnetic spectrum (e.g., wavelengths of electromagnetic radiation greater than or equal to approximately 380 nanometers and less than or equal to approximately 780 nanometers) weighted by a photopic sensitivity curve (i.e., an average sensitivity of a human eye). The photopic transmittance $\tau_s(p)$ for a given optically transmissive state can be calculated by Equation (1) as follows:

$$\tau_s(p) = \frac{\int_{\lambda_{min}}^{\lambda_{max}} \tau_s(\lambda) I_p(\lambda) d\lambda}{\int_{\lambda_{min}}^{\lambda_{max}} I_p(\lambda) d\lambda} \tag{1}$$

where $\lambda_{max}$ is the maximum wavelength of the visible range (e.g., 780 nanometers), $\lambda_{min}$ is the minimum wavelength of the visible range (e.g., 380 nanometers), $\tau_s(\lambda)$ is the transmittance of multi-layer stack 101 in a given state at any wavelength in the visible range, and $I_p(\lambda)$ is the photopic intensity function.

Accordingly, the photopic transmittance ratio can be represented by Expression (2) as follows:

$$\frac{\tau_m(p)}{\tau_l(p)} \tag{2}$$

where $\tau_m(p)$ is the photopic transmittance in the more optically transmissive state and $\tau_l(p)$ is the photopic transmittance in the less optically transmissive state.

The color of the window in the bleached or colored state can also be described by the L*a*b* color space. In this color space L* indicates the lightness with the darkest black at L*=0 and the brightest white at L*=100, a* indicates the red/green component of color with green at negative a* and red at positive a* values, and b* indicates the yellow/blue component of color with blue at negative b* and yellow at positive b* values.

The "auxiliary electrode(s)" are electrodes used to supply an independent sequestration potential to the redox elements of this disclosure. The auxiliary electrode are therefore electrically isolated from the electrically conductive layers, which apply potential to the anode(s) and cathode(s) of the EC device to switch the EC device from a more transmissive state to a less transmissive state.

DETAILED DESCRIPTION

Electrochromic Device with Redox Elements

Among the various aspects of the present disclosure is the provision of an electrochromic (EC) device with a redox element, where the redox element sequesters charge from one or more layers comprising the electrochromic device. In some cases, the redox element sequesters charge to mitigate or prevent performance degradation of the electrochromic device resulting from faradic losses. In some cases, the redox element sequesters charge to mitigate or prevent a decrease in the photopic ratio of the electrochromic device.

FIG. 1 illustrates a representative block diagram of an electrochromic device 100, according to an embodiment. Electrochromic device 100 is merely exemplary and is not limited to the embodiments presented herein. Electrochromic device 100 can be employed in many different embodiments or examples not specifically depicted or described herein.

Electrochromic device 100 includes multi-layer stack 101, redox element 102, and in some embodiments, electric power supply 103. In general, electrochromic device 100 has a first electrode layer and a second electrode layer separated by an ion conductor which ionically couples the first and second electrode layers. At least one of the first and second electrode layers has an electrochromic material thereby enabling the device to reversibly cycle between an optically less transmissive state and an optically more transmissive state upon the application of an appropriate potential to the electrodes. The multi-layer stack is capable of reversibly cycling between an optically less transmissive state and an optically more transmissive state in response to an electrical potential applied to the multi-layer stack. The multi-layer stack includes, in succession, a first substrate, a first electrically conductive layer, a first electrode layer electrically coupled to the first electrically conductive layer and has a first electrode material, an ion conductor layer, a second electrode layer with a second electrode material, a second electrically conductive layer electrically coupled to the second electrode layer, and a second substrate. The first electrode material and/or the second electrode material is made up of an electrochromic material and at least one of the first and second substrates is optically transparent.

In different cases the ion conductor thickness can vary. In some cases, the ion conductor is thicker than 1 micron, or the ion conductor is from 200 to 250 microns, or is from 200 to 300 microns, or is from 300 to 500 microns.

In some aspects of the present disclosure, the redox element is made up of a passive redox element, an active redox element, or combination of both active and passive redox elements. Passive redox elements have sequestration materials that are oxidized or reduced to sequester charge from the other layers of the electrochromic device in response to an applied potential. Active redox elements sequester charge from the other layers of the electrochromic device in response to a potential applied through one or more auxiliary electrodes coupled to auxiliary control circuitry. The auxiliary electrode(s) are electrically isolated from the electrically conductive layers, which apply potential to the anode(s) and cathode(s) of the EC device to switch the EC device from a more transmissive state to a less transmissive state, thereby allowing a sequestration potential to be applied independently from the potential between the anode and cathode of the EC device.

There are four main categories of EC devices with redox elements described in this disclosure, 1) passive redox elements, 2) active redox elements, 3) enhanced active redox elements, and 4) organic redox elements. Some embodiments of each of the four main categories are schematically illustrated in FIGS. 2a, 2b, 3, 4, 5a, 5b and 5c.

Figure 2A:
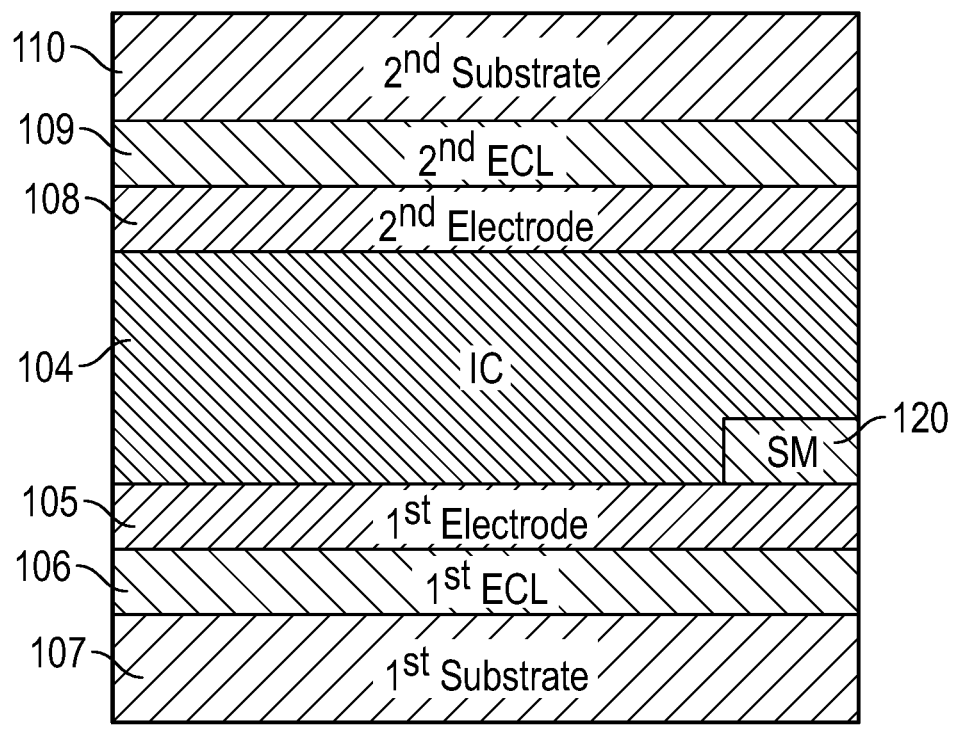
FIG. 2a is a schematic cross-section of a multi-layer electrochromic device with a passive redox element.

FIG. 2a schematically illustrates a first embodiment of the first category (passive redox elements). This is an embodiment of a passive redox element in which a sequestration material 120 is placed in contact with the first electrode layer 105 (i.e., the anode or the cathode of the EC device). Alternatively, in some embodiments, the sequestration material (SM) 120 is placed in contact with the second electrode layer 108 (i.e., the anode or the cathode of the EC device). The SM 120 is in ionic communication with the ion conductor (IC) 104, which is in ionic communication with both the first and second electrode layers 105 and 108 (i.e., the anode and the cathode of the EC device). The first and second electrically conductive layers (ECLs) 106 and 109 deliver (i.e. apply) the potential to the first and second electrode layers 105 and/or 108 (i.e., the anode and/or cathode of the EC device) to switch the EC device from a more transmissive state to a less transmissive state (or a less transmissive state to a more transmissive state), and also apply a sequestration potential whereby the SM 120 sequesters charge from the first and/or second electrode layer(s) 105 and/or 108 (i.e., the anode and/or cathode of the EC device).

Figure 2B:
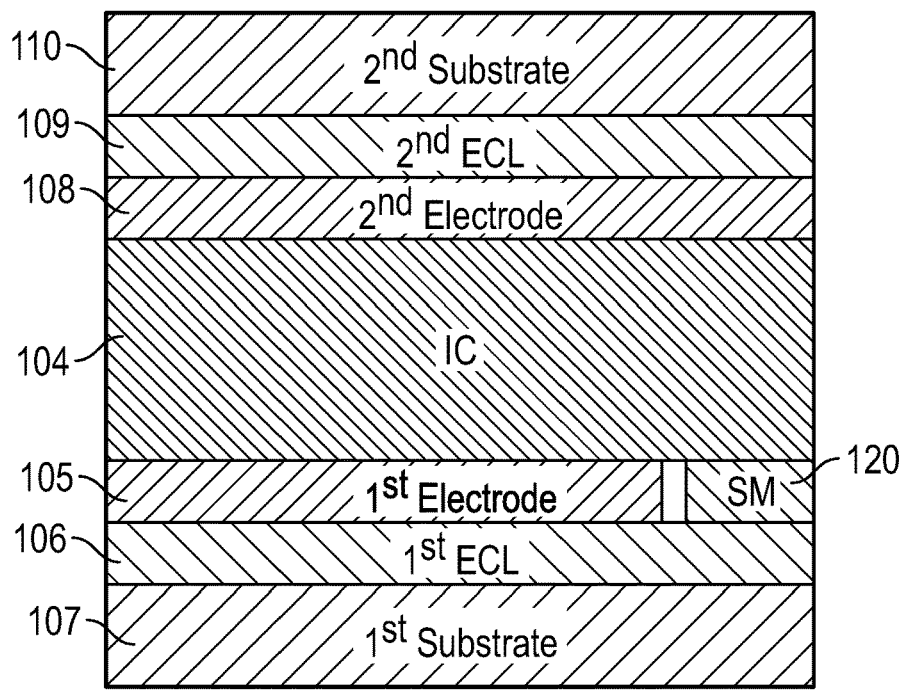
FIG. 2b is a schematic cross-section of a multi-layer electrochromic device with a passive redox element.

FIG. 2b schematically illustrates a second embodiment of the first category (passive redox elements). This is an embodiment of a passive redox element in which a sequestration material (SM) 120 is placed in contact with the first electrically conductive layer (ECL) 106. Alternatively, in some cases of the first category, the sequestration material 120 is placed in contact with the second electrically conductive layer 109. The SM 120 is in ionic communication with the ion conductor (IC) 104, which is in ionic communication with both the first and second electrode layers 105 and 108 (i.e., the anode and the cathode of the EC device). The first and second electrically conductive layers (ECLs) 106 and 109 apply the potential to the first and second electrode layers 105 and/or 108 (i.e., the anode and/or cathode of the EC device) to switch the EC device from a more transmissive state to a less transmissive state (or a less transmissive state to a more transmissive state), and also apply a sequestration potential whereby the SM 120 sequesters charge from the first and/or second electrode layer(s) 105 and/or 108 (i.e., the anode and/or cathode of the EC device).

Figure 3:
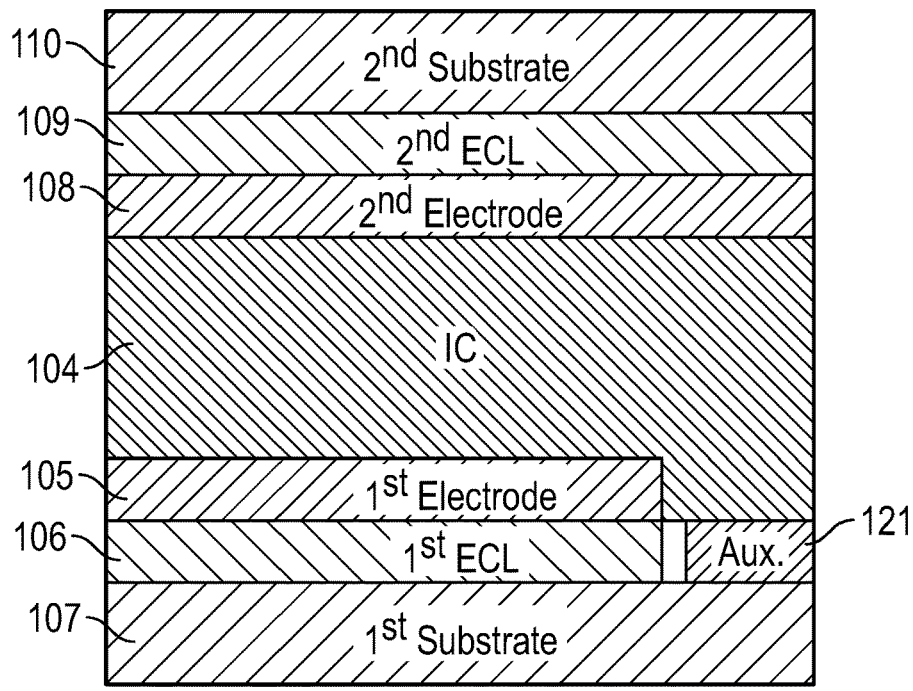
FIG. 3 is a schematic cross-section of a multi-layer electrochromic device with an active redox element.

FIG. 3 schematically illustrates an embodiment of the second category (active redox elements). This is an embodiment of an active redox element in which an auxiliary electrode 121 is electrically isolated from the first and second electrically conductive layers (ECLs) 106 and 109. In some embodiments, the auxiliary electrode 121 is located on the first substrate 107 along with the first ECL 106. In some embodiments, the auxiliary electrode 121 is located on the second substrate 110 along with the second ECL 109. In the second category, the auxiliary electrode 121 is in ionic communication with the ion conductor (IC) 104, which is in ionic communication with both the first and second electrode layers 105 and 108 (i.e., the anode and the cathode of the EC device). In the second category, the first and second electrically conductive layers (ECLs) 106 and 109 apply the potential to the first and second electrode layers 105 and/or 108 (i.e., the anode and/or cathode of the EC device) to switch the EC device from a more transmissive state to a less transmissive state (or a less transmissive state to a more transmissive state), and the auxiliary electrode applies a sequestration potential whereby the material comprising the auxiliary electrode 121 sequesters charge from the first and/or second electrode layer(s) 105 and/or 108 (i.e., the anode and/or cathode of the EC device).

Figure 4:
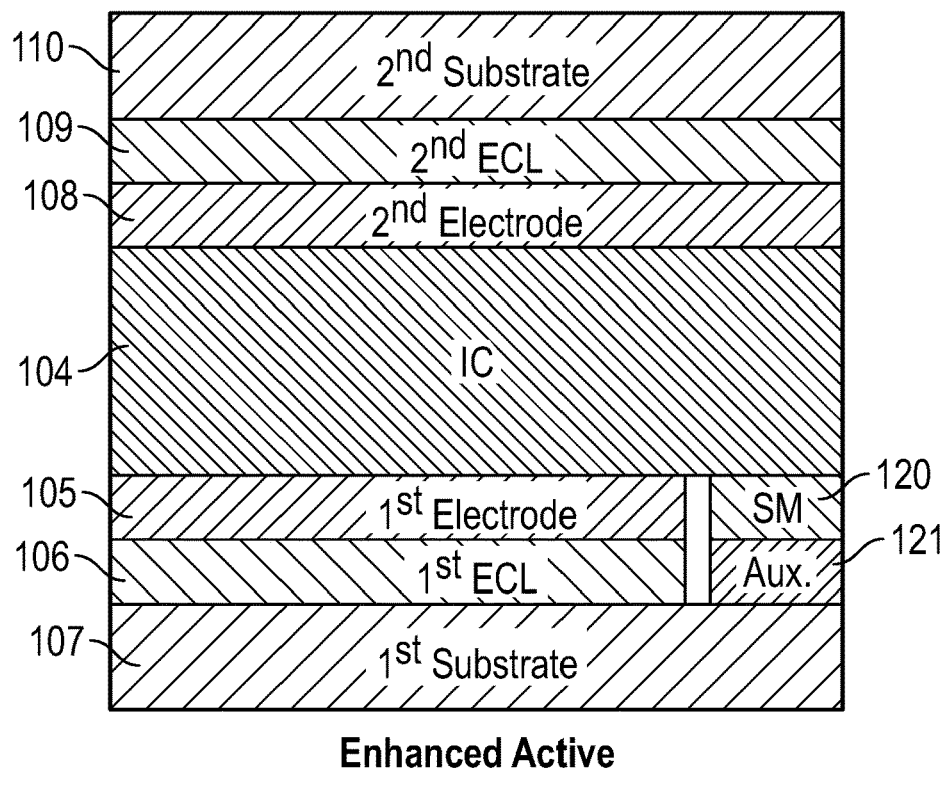
FIG. 4 is a schematic cross-section of a multi-layer electrochromic device with an enhanced active redox element.

FIG. 4 schematically illustrates an embodiment of the third category (enhanced active redox elements). This is an embodiment of an enhanced active redox element in which a sequestration material (SM) 120 and an auxiliary electrode 121 are in electrical contact with one another, and are electrically isolated from the first and second electrically conductive layers (ECLs) 106 and 109. In some embodiments, the SM 120 and the auxiliary electrode 121 are located on the first substrate 107 along with the first ECL 106. In some embodiments, the SM 120 and the auxiliary electrode 121 are located on the second substrate 110 along with second ECL 109. In the third category, the SM 120 is in ionic communication with the ion conductor (IC) 104, which is in ionic communication with both the first and second electrode layers 105 and 108 (i.e., the anode and the cathode of the EC device). In the third category, the first and second electrically conductive layers (ECLs) 106 and 109 apply the potential to the first and second electrode layers 105 and/or 108 (i.e., the anode and/or cathode of the EC device) to switch the EC device from a more transmissive state to a less transmissive state (or a less transmissive state to a more transmissive state), and the auxiliary electrode delivers a sequestration potential to the SM 120 whereby the SM 120 sequesters charge from the first and/or second electrode layer(s) 105 and/or 108 (i.e., the anode and/or cathode of the EC device).

Figure 5A:
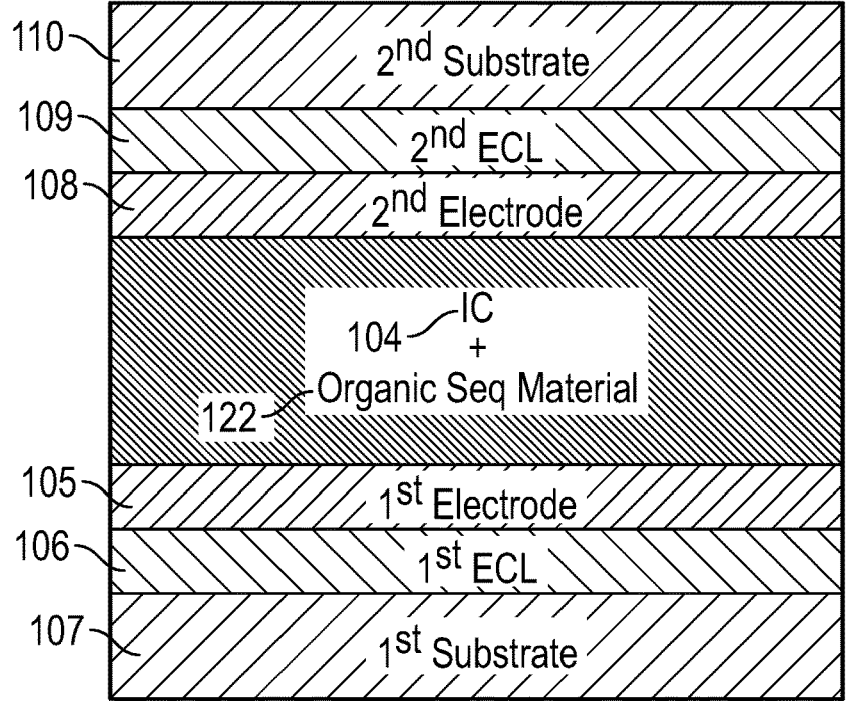
FIG. 5a is a schematic cross-section of a multi-layer electrochromic device with an organic redox element.

FIG. 5a schematically illustrates a first embodiment of the fourth category (organic redox elements). This is an embodiment of an organic redox element in which an organic sequestration material (OSM) 122 is mixed with, or incorporated in, the ion conductor (104) of the EC device. The ion conductor (IC) 104 is in ionic communication with both the first and second electrode layers 105 and 108 (i.e., the anode and the cathode of the EC device). In these embodiments of the fourth category, the first and second electrically conductive layers (ECLs) 106 and 109 apply the potential to the first and second electrode layers 105 and/or 108 (i.e., the anode and/or cathode of the EC device) to switch the EC device from a more transmissive state to a less transmissive state (or a less transmissive state to a more transmissive state), and also apply a sequestration potential whereby the OSM 122 sequesters charge from the first and/or second electrode layer(s) 105 and/or 108 (i.e., the anode and/or cathode of the EC device).

Figure 5B:
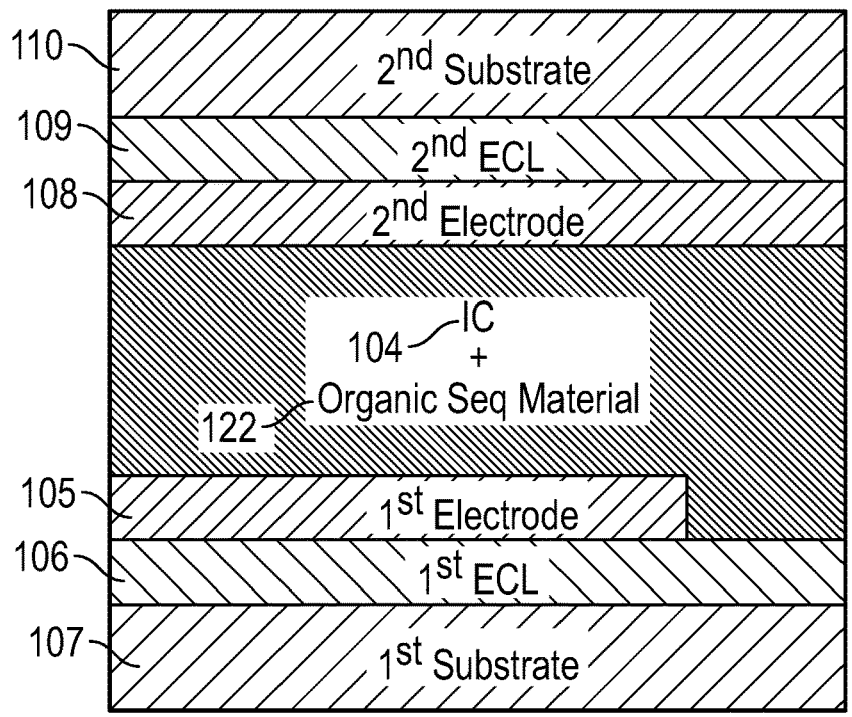
FIG. 5b is a schematic cross-section of a multi-layer electrochromic device with an organic redox element.

FIG. 5b schematically illustrates a second embodiment of the fourth category (organic redox elements). This is an embodiment of an organic redox element in which an organic sequestration material (OSM) 122 is mixed with, or incorporated in, the ion conductor (104) of the EC device. In some embodiments, the ion conductor (IC) 104 is in ionic communication with both the first and second electrodes 105 and 108 (i.e., the anode and the cathode of the EC device) and the first electrically conductive layer (ECL) 106. In some embodiments, the ion conductor (IC) 104 is in ionic communication with both the first and second electrode layers 105 and 108 (i.e., the anode and the cathode of the EC device) and the second electrically conductive layer (ECL) 109. In these embodiments of the fourth category, the first and second electrically conductive layers (ECLs) 106 and 109 apply the potential to the first and second electrode layers 105 and/or 108 (i.e., the anode and/or cathode of the EC device) to switch the EC device from a more transmissive state to a less transmissive state (or a less transmissive state to a more transmissive state), and also apply a sequestration potential whereby the OSM 122 sequesters charge from the first and/or second electrode layer(s) 105 and/or 108 (i.e., the anode and/or cathode of the EC device).

Figure 5C:
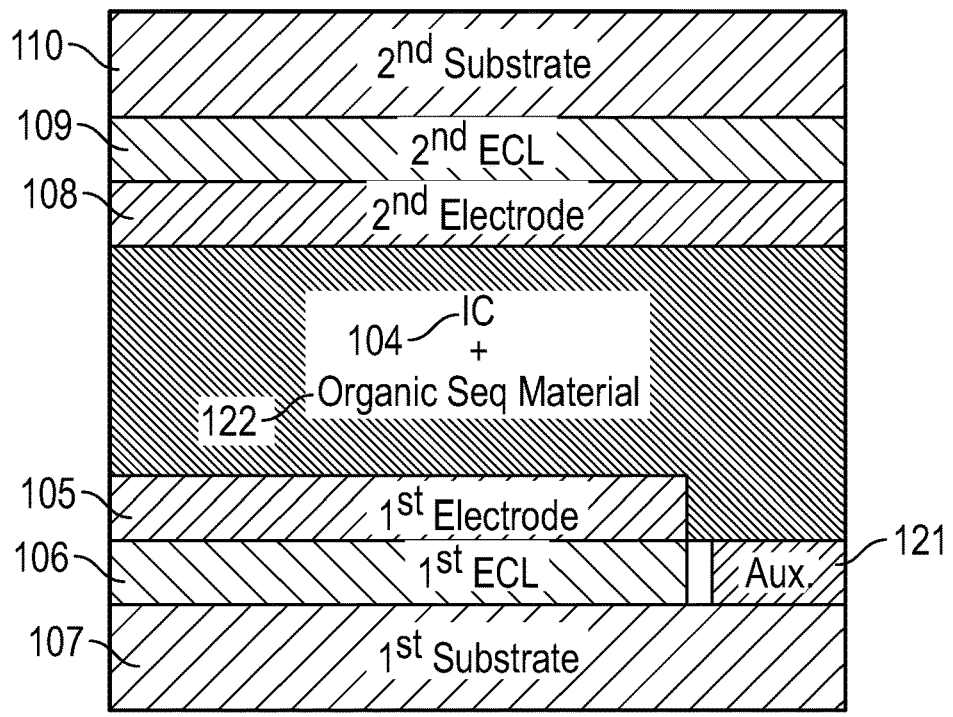
FIG. 5c is a schematic cross-section of a multi-layer electrochromic device with an organic redox element.

FIG. 5c schematically illustrates a third embodiment of the fourth category (organic redox elements). This is an embodiment of an organic redox element in which an organic sequestration material (OSM) 122 is mixed with, or incorporated in, the ion conductor (104) of the EC device. In some embodiments, the ion conductor (IC) 104 is in ionic communication with both the first and second electrode layers 105 and 108 (i.e., the anode and the cathode of the EC device), and the auxiliary electrode 121. In some embodiments, the auxiliary electrode 121 is located on the first substrate 107 along with the first ECL 106. In some embodiments, the auxiliary electrode 121 is located on the second substrate 110 along with the second ECL 109. In these embodiments of the fourth category, the first and second electrically conductive layers (ECLs) 106 and 109 are used to apply potential to the first and second electrode layers 105 and/or 108 (i.e., the anode and/or cathode of the EC device) to switch the EC device from a more transmissive state to a less transmissive state (or a less transmissive state to a more transmissive state), and a sequestration potential is applied between the auxiliary electrode and one of the electrode layers whereby the OSM 122 sequesters charge from the first and/or second electrode(s) 105 and/or 108 (i.e., the anode and/or cathode of the EC device).

In general, in all of the four main categories, the sequestration material (SM), auxiliary electrode, or organic sequestration material (OSM) can be oxidized or reduced in a redox reaction in response to an electrical potential applied to the multi-layer stack. In general, in all of the four main categories, the sequestration material (SM), organic sequestration material (OSM), or the materials comprising the auxiliary electrode can be oxidized or reduced in a redox reaction in response to an electrical potential applied to the multi-layer stack by accepting ionic species (e.g., $H^+$ or $Li^+$). In some cases, the redox element can be both reducible and oxidizable to correct for both spurious oxidation and/or spurious reduction. In some cases, the redox element can be reducible and oxidizable to correct for spurious oxidation and/or reduction in the anode and/or cathode.

In some cases, spurious oxidation of the anode, cathode or both, leads to unbalanced reduction of the cathode. In those cases, the redox element is required to be reducible to reoxidize the cathode. In some instances, spurious oxidation includes photooxidation.

In some cases, the redox element needs to be oxidizable. Spurious reduction would lead to unbalanced oxidation of the anode. Water, oxygen, impurities in the IC and other components in either the IC or the materials themselves could in principle be reduced. In the situation where there is spurious reduction, the redox element is required to be oxidizable to adjust the oxidation state of the anode by reducing the anode.

In other cases, if some component of the ion conductor were to suffer from spurious reduction or oxidation, and this process were electrochromic and reversible, then the redox element could also be used to adjust the oxidation state of that component of the ion conductor by reducing or oxidizing that component.

In general, in all of the four main categories, the redox element includes one or more materials having a composition (i) that can be oxidized or reduced in a redox reaction in response to an electrical potential applied to the multi-layer stack and (ii) that differs from the composition of the first and second electrode materials.

In some cases, the redox element includes an auxiliary electrode and control circuitry coupled to the auxiliary electrode and the first or second electrode layer, the control circuitry configured to periodically adjust the oxidation state of the first or second electrode layer relative to the auxiliary electrode to compensate for faradaic losses as the electrochromic device is reversibly cycled between the optically less transmissive and optically more transmissive states.

In some cases, an electrochromic device has a multi-layer stack comprising a first electrode layer having an upper and a lower surface, a second electrode layer having an upper and a lower surface, an auxiliary electrode having an upper and a lower surface, and an ion conductor layer, wherein the first electrode and/or the second electrode includes an electrochromic material. The upper surface of the first electrode and the upper surface of the auxiliary electrode oppose the lower surface of the second electrode and are ionically connected to the lower surface of the second electrode via the ion conductor layer.

Electronic and Optical Properties of Electrochromic Devices with Redox Elements

Further, the multi-layer stack includes a state of charge and an open-circuit electrical potential corresponding to the state of charge that vary as the multi-layer stack cycles between the optically less transmissive state and the optically more transmissive state.

Over its life, electrochromic device 101 may experience faradaic losses. For example, the electrochromic device may experience faradaic losses as a result of a photochemical oxidation reaction, by means of a reaction between the electrolyte and an oxidizing electrode surface during cycling between the optically less transmissive and optically more transmissive states, or by any of a range of other spurious oxidation mechanisms involving water, oxygen, and/or a component of an ion conducting material (e.g., an ion conductor layer). Advantageously, redox element 102 has the capacity to compensate for such faradaic losses over the lifetime of the electrochromic device.

For example, spurious oxidation can result at multi-layer stack 101 from (i) reactions of water, oxygen, and/or the ion conductor and one of the electrodes of multi-layer stack 101 (i.e., oxidation of the ion conductor) and/or (ii) photochemical oxidation of water and/or the ion conductor of multi-layer stack 101 as multi-layer stack 101 is repeatedly cycled between the optically less and more transmissive states. In these embodiments, the auxiliary electrode can be selectively reduced to compensate for (e.g., offset) this spurious oxidation that would otherwise reduce one of the electrodes of multi-layer stack 101 and throw off the operating electrical potential range of multi-layer stack 101, the open-circuit electrical potentials corresponding to one or more of the states of charge of multi-layer stack 101, and/or the range of the states of charge of multi-layer stack 101 corresponding to the optically transmissive states from the optically less transmissive state to the optically more transmissive state.

In another example, prior to multi-layer stack 101 repeatedly cycling between the optically less and more transmissive states, the auxiliary electrode (or the redox element) can also be selectively oxidized or reduced to establish (e.g., set) the operating electrical potential range of multi-layer stack 101, the open-circuit electrical potentials corresponding to one or more of the states of charge of multi-layer stack 101, and/or the range of the states of charge of multi-layer stack 101 corresponding to the optically transmissive states from the optically less transmissive state to the optically more transmissive state. For example, the initial states of charge of one or more of the electrochromic materials, the operating electrical potential range of multi-layer stack 101, the open-circuit electrical potentials corresponding to one or more of the states of charge of multi-layer stack 101, and/or the range of the states of charge of multi-layer stack 101 corresponding to the optically transmissive states from the optically less transmissive state to the optically more transmissive state can be dependent on various manufacturing conditions. Accordingly, the auxiliary electrode (or the redox element) can also be selectively oxidized or reduced to change the operating electrical potential range of multi-layer stack 101, the open-circuit electrical potentials corresponding to one or more of the states of charge of multi-layer stack 101, and/or the range of the states of charge of multi-layer stack 101 corresponding to the optically transmissive states from the optically less transmissive state to the optically more transmissive state in order to initially establish (e.g., set) the operating electrical potential range of multi-layer stack 101, the open-circuit electrical potentials corresponding to one or more of the states of charge of multi-layer stack 101, and/or the range of the states of charge of multi-layer stack 101 corresponding to the optically transmissive states from the optically less transmissive state to the optically more transmissive state.

Additionally, the initial optical states of the layers may not be matched to one another (i.e., initially one layer may be more transmissive and one layer may be less transmissive). The redox element (passive, active, enhanced active, or organic) can in such cases be utilized to change the state of charge of one or more layers within the multi-layer stack to establish (e.g., set) the initial optical states of the layers to match one another.

An aspect of the present disclosure is the provision of a process for compensating for faradic losses in an electrochromic device comprising a redox element and a multi-layer stack. This process can include adjusting the oxidation state of the first and/or second electrode layer relative to the redox element to compensate for faradaic losses that arise over time as the electrochromic device is reversibly cycled between the optically less transmissive and optically more transmissive states. This process can also include cycling the multi-layer device between an optically less transmissive state and an optically more transmissive state and sequestering charge from the first and/or second electrode layer to the redox element to compensate for faradaic losses as the electrochromic device is reversibly cycled between the optically less transmissive and optically more transmissive states.

In operation, multi-layer stack 101 switches or reversibly cycles between optically less and optically greater transmissive states in response to an electrical potential applied to multi-layer stack 101. Multi-layer stack 101, and more specifically the first and second electrodes of multi-layer stack 101, also have state(s) of charge. The optically less and more transmissive states, and the optically transmissive states in between, each correspond to different state of charge of multi-layer stack 101 (i.e., a range of the states of charge of multi-layer stack 101). As discussed in greater detail below, redox element 102 is oxidized or reduced (e.g., selectively relative to the first or second electrodes) in a redox reaction to initially establish and/or maintain (e.g., inhibit a change in) the operating electrical potential range of multi-layer stack 101 (i.e., the operating electrical potential ranges of the electrodes of multi-layer stack 101) and consequently, the range of states of charge of multi-layer stack 101 corresponding to the optically transmissive states.

One of the electrodes of multi-layer stack 101 is operable as an anodic electrode and one of the electrodes of multi-layer stack 101 is operable as a cathodic electrode. In some cases, the anodic electrode has an operable electrical potential range versus lithium/lithium-ion (Li/Li$^+$) that is greater than or equal to approximately 2.9 Volts and less than or equal to approximately 4.0 Volts, and in some cases the cathodic electrode has an operable electrical potential range versus lithium/lithium-ion that is less than or equal to approximately 3.0 Volts and greater than or equal to approximately 2.3 Volts.

Meanwhile, in some cases, redox element 102 comprises an auxiliary electrode. The auxiliary electrode may optionally comprise an electrochemically active material that is distinct from the electrochemically active materials of the electrodes of multi-layer stack 101, such as, for example, the anodically active material, the anodic electrochromic material, the cathodically active material, and/or the cathodic electrochromic material, and/or the materials of the electrically conducting elements of multi-layer stack 101. In operation, the auxiliary electrode can be oxidized or reduced (e.g., selectively relative to the first or second electrode) in a redox reaction, such as, for example, in response to an electrical potential being applied to multi-layer stack 101 (i.e., to the electrodes of multi-layer stack 101 via the electrically conductive elements of multi-layer stack 101) and/or redox element 102. The redox reaction can be reversible, at least partially irreversible, or substantially irreversible. In some cases, the auxiliary electrode can remain substantially transparent before, when, and/or after the auxiliary electrode is selectively oxidized or reduced in the redox reaction. The operating electrical potential for the auxiliary electrode can depend on the operating electrical potentials of the electrodes of multi-layer stack 101.

In some cases, redox element 102 also comprises a sequestration material in addition to the auxiliary electrode (i.e., a discrete component of the multi-layer structure from the auxiliary electrode). In general, the sequestration material may be oxidized or reduced relative to the other components of the multi-layer stack to compensate for Faradaic loss in the multi-layer stack. More specifically, the sequestration material may be oxidized or reduced at applied potentials within or outside the operating voltages applied to the multi-layer stack to reversibly switch the first and second electrodes between the optically more and optically less transmissive states. For example, and using an electrochromic device that is reversibly cycled between an optically less transmissive state and an optically more transmissive state at operating voltages (vs Li/Li$^+$) of about 2.9 to 4.0 V for the anodic electrode (e.g., the first electrode) and 3.0 to 2.3 V for the cathodic electrode (e.g., the second electrode), an organic sequestration material that is reduced at a voltage in the range of about 2.3 to 1.3 V may be utilized and accessed as the device is cycled from the optically more transmissive to the optically less transmissive state (sometimes referred to as "bleaching"). Additionally, the sequestration material may be electrically isolated and reduced at a voltage less than 1.3 V or greater than 2.3 V.

In general, the sequestration material may be oxidized and/or reduced at a voltage that is outside of the normal operating range of the electrochromic device. In some cases this is advantageous, because the sequestration reaction can be selectively initiated separately from the normal operation (e.g., switching) of the electrochromic device.

In some cases, the redox element (e.g., sequestration material or auxiliary electrode material) is electrochemically reducible in the redox reaction in an electrical potential range versus lithium/lithium-ion that is less than or equal to approximately 3.4 Volts and greater than or equal to approximately 0.7 Volts.

In some cases, the redox element (e.g., sequestration material or auxiliary electrode material) is electrochemically oxidizable in the redox reaction in an electrical potential range versus lithium/lithium-ion that is greater than or equal to approximately 2 Volts and less than or equal to approximately 4.2 Volts.

In some cases, the redox elements will have redox potentials (when converted to the Li/Li+ potential) from 3.9 to 4.8 V, or from 3 to 5 V, or from 3.5 to 5 V, or from 4 to 5 V. In some cases, the redox elements will be reduced or oxidized at a cell potential from −0.5 to −1 V, or from −1 to −1.5 V, or from −1.5 to −2 V, or from −2 to −2.5 V, or from −2.5 to −3 V, or from −3 to −3.5 V, or from −3.5 to −4.0 V, or from −0.5 to −4.0 V, or from 0.5 to 1 V, or from 1 to 1.5 V, or from 1.5 to 2 V, or from 2 to 2.5 V, or from 0.5 to 2.5 V.

In certain cases, the oxidation or reduction of the sequestration material in the redox reaction is substantially irreversible. That is, during the reversible cycling of the multi-layer stack from between the optically less and optically more transmissive states, the oxidation state of the sequestration material is not reversibly cycled between a greater and a lesser oxidation state. In some cases, the oxidation or reduction of the sequestration material in the redox reaction is reversible. In some cases, the oxidation or reduction of the sequestration material in the redox reaction is irreversible.

In some cases, the electric power supply 103 may be configured to apply an electrical potential (i.e., one electrical potential) to only multi-layer stack 101 and not the redox element 102, and the redox element 102 is passive. In some of these cases, the redox element is oxidized or reduced in the redox reaction when an electrical potential is applied to multi-layer stack 101 (i.e., to the first and/or second electrodes of multi-layer stack 101 via the electrically conductive elements of multi-layer stack 101) and redox element 102 falls within one or more passive sequestration electrical potential ranges. That is, in some of these cases, the redox element is oxidized or reduced in the redox reaction by application of an electrical potential within the passive sequestration electrical potential range(s) to multi-layer stack 101 (i.e., to the electrodes of multi-layer stack 101 via the electrically conductive elements of multi-layer stack 101) and redox element 102. The passive sequestration electrical potential range(s) for a given case of multi-layer stack 101 can depend on the operational electrical potential range of multi-layer stack 101. In some cases, the operational electrical potential range of multi-layer stack 101 can include the passive sequestration electrical potential range(s) of multi-layer stack 101. In some cases, the passive sequestration electrical potential range(s) are outside of the potential range applied to the multi-layer stack to cycle between the less transmissive to the more transmissive states. In some cases, the passive sequestration electrical potential range(s) are outside of the potential range applied to the multi-layer stack to cycle between the less transmissive to the more transmissive states during normal operation (i.e., when sequestration is not intended).

In some cases, the multi-layer stack 101 and redox element 102 are configured to receive electrical potentials (i.e., separate electrical potentials) independently of each other, such as, for example, both from electric power supply 103 or from electric power supply 103 and a second (e.g., independent) electric power supply, and redox element 102 is active. In these cases, the redox element 102 is selectively oxidized or reduced in the redox reaction by selective application of an electrical potential to redox element 102. For example, the electrical potential can be selectively applied to redox element 102 by external circuitry that selectively couples redox element 102 to one of the electrodes of multi-layer stack 101, the management of which is discussed in greater detail below. Selectively coupling redox element 102 to one of the electrodes of multi-layer stack 101 can be accomplished by implementing any suitable electrical switching element (e.g., a relay, a transistor, etc.).

The redox element may be made up of materials that remain substantially transparent after oxidization or reduction in the redox reaction.

The transparency and/or color of the materials making up the redox element may also change after oxidization or reduction in the redox reaction. In some cases, the redox element includes materials that become optically less transmissive after oxidation or reduction in the redox reaction, but the redox element is distributed in the multi-layer stack in such a manner that does not significantly affect the transmissivity of the multi-layer stack and/or the transmissivity of the region of interest of the multi-layer stack.

There are also a number of electronic metrics for electrochromic devices. The charge retained in the electrochromic device in a given state is of particular importance to this disclosure, because the charge in electrochromic devices will tend to change over time due to spurious oxidation or reduction. In turn, the optical properties of the device are affected by the state of charge in the electrochromic materials in the device.

In some cases, the EC devices described in this disclosure, have a photopic transmittance ratio of the more optically transmissive state to the less optically transmissive state greater than or equal to approximately 4:1, or the photopic transmittance ratio is greater than 5:1, or the photopic transmittance ratio is from 5:1 to 30:1.

The optically less and more transmissive states are to be understood as relative terms as discussed above. In some cases, the optically less transmissive state can be at least approximately one, two, three, five, ten, twenty, thirty, forty, fifty, sixty, seventy, eighty or ninety percent less optically transmissive than the optically more transmissive state, and the optically more transmissive state can be at least approximately one, two, three, five, ten, twenty, thirty, forty, fifty, sixty, seventy, eighty or ninety percent more optically transmissive than the optically less transmissive state. In some cases, the Tvis of the optically less transmissive state can be at least approximately one, two, three, five, ten, twenty, thirty, forty, fifty, sixty, seventy, eighty or ninety percent less optically transmissive than the Tvis of the optically more transmissive state, and the Tvis of the optically more transmissive state can be at least approximately one, two, three, five, ten, twenty, thirty, forty, fifty, sixty, seventy, eighty or ninety percent more optically transmissive than the Tvis of the optically less transmissive state.

In some cases, in many different embodiments, the reduction or oxidation of the electrochromic electrodes via the redox element, resulting from an applied potential outside of the normal operating voltage range of the device, occurs quickly. In some embodiments, the reduction or oxidation of the electrochromic electrodes via the redox element, resulting from an applied potential outside of the normal operating voltage range of the device, changes the transmission at 550 nm or Tvis by more than 0.1%, or more than 0.5%, or more than 1%, or more than 2%, or more than 4%, or more than 6%, or more than 10%, or more than 20%, or more than 30%, or more than 40%, or more than 50%, or more than 60%, or more than 70%, or more than 80% in less than 24 hours, or less than 12 hours, or less than 6 hours, or less than 2 hours, or less than 1 hour, or less than 30 minutes, or less than 15 minutes, or less than 10 minutes, or less than 5 minutes, or less than 2 minutes.

Embodiments of Electrochromic Devices with Redox Elements

Figure 6:
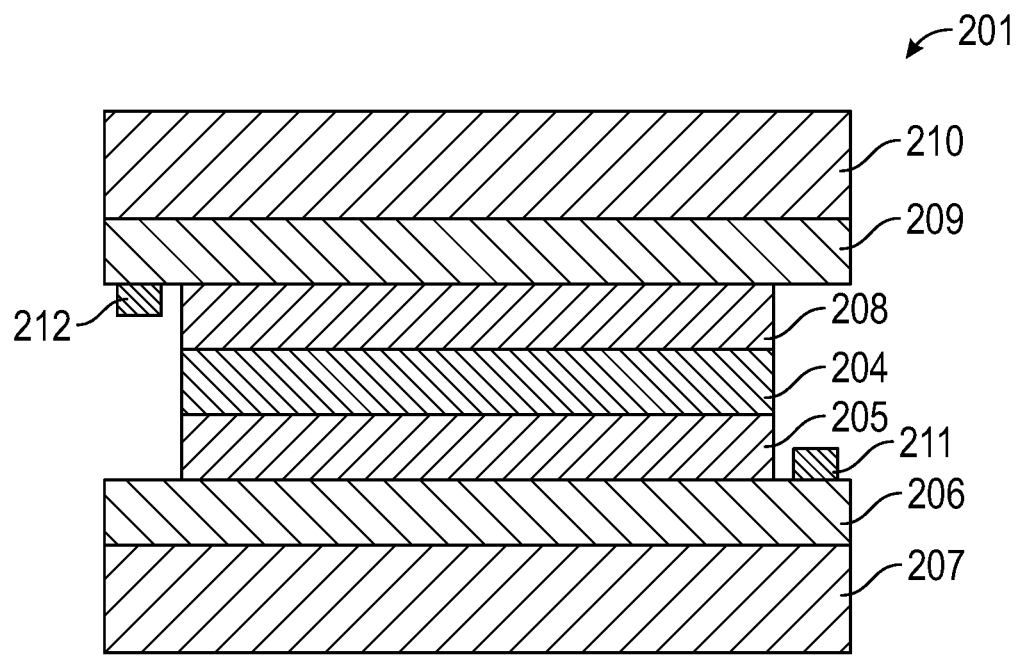
FIG. 6 is a schematic cross-section of a multi-layer electrochromic device of the present invention.

FIG. 6 illustrates a cross-sectional structural diagram of an exemplary multi-layer stack 201, according to the embodiment of FIG. 1. Accordingly, multi-layer stack 201 can include ion conductor layer 204. Moving outward successively from a first side of ion conductor layer 204, multi-layer stack 201 can include first electrode layer 205, first electrically conductive layer 206, and first substrate 207. Meanwhile, moving outward successively from a second side of ion conductor layer 204, multi-layer stack 201 can include second electrode layer 208, second electrically conductive layer 209, and second substrate 210. Typically, at least one of first substrate 207 and second substrate 210 will be optically transparent; for example, in some embodiments each of first substrate 207 and second substrate 210 are optically transparent. Also, multi-layer stack 201 and/or first electrically conductive layer 206 can include bus bar 211; and/or multi-layer stack 201 and/or second electrically conductive layer 209 can include bus bar 212. In some cases, the multi-layer stack 201 of FIG. 6 is similar or identical to the multi-layer stack 101 of FIG. 1.

Multi-layer stack 101 can have two electrically conductive elements (e.g., first electrically conductive layer 206 (FIG. 6) and/or second electrically conductive layer 209 (FIG. 6)) and each electrically conductive element is in electrical contact with a bus bar (e.g., bus bar 211 (FIG. 6) or bus bar 212 (FIG. 6)). Additionally, multi-layer stack 101 can have two or more substrates (e.g., substrate 207 (FIG. 6) and/or substrate 210 (FIG. 6)). In other cases, the substrate(s) can be omitted.

The electrically conductive elements of multi-layer stack 101 are electrically coupled to the terminals of electric power supply 103 by the respective bus bars of the electrically conductive elements. The electric power supply 103 can provide an electrical potential (e.g., voltage) to multi-layer stack 101 (i.e., to the electrodes of multi-layer stack 101 via the electrically conductive elements of multi-layer stack 101). In some cases, electric power supply 103 can provide an electrical potential (e.g., voltage) to redox element 102. As discussed in greater detail below, in some cases, electric power supply 103 can apply the electrical potential (i.e., one electrical potential) to both multi-layer stack 101 and redox element 102, or in other cases, electrical power supply 103 can apply electrical potentials (i.e., separate electrical potentials) to multi-layer stack 101 and redox element 102 independently of each other. Accordingly, electric power supply 103 can include any suitable electric power source configured to provide electricity to multi-layer stack 101 and/or redox element 102.

In some cases, the ion conductor, the electrodes, the electrically conductive elements, and the substrates of multi-layer stack 101 can be implemented as layers. Accordingly, in these or other cases, moving outward successively from the ion conductor of multi-layer stack 101, the electrodes of multi-layer stack 101 can be located at opposing sides of the ion conductor of multi-layer stack 101, followed in some cases by the electrically conductive elements of multi-layer stack 101, and followed in some cases by one or more of the substrates. Implementing the ion conductor, the electrodes, the electrically conductive elements, and the substrates of multi-layer stack 101 as layers (e.g., so that multi-layer stack 101 is approximately planar) can permit electrochromic device 100 to be more conducive for implementation in mirrors (e.g., for vehicles), windows (e.g., automotive windows, aircraft windows, marine windows, architectural windows, etc.), or other substantially planar devices. The first electrode layer can have an upper and lower surface, the second electrode layer can have an upper and lower surface, wherein the upper surface of the first electrode and the lower surface of the second electrode are on and directly connected to opposing sides of ion conductor layer.

The redox element can share the same substrate as the first or second electrically conductive layer. In some cases the redox element has approximately the same thickness as the first or second electrically conductive layer. In some cases the redox element has approximately the same thickness as the first or second electrode materials. The redox element can be located on either the first or the second substrate and function to sequester charge from either the anode or the cathode.

In various cases, the redox element can be located laterally adjacent to (i) the first electrically conductive layer, (ii) the first electrode layer, (iii) the ion conductor layer, (iv) the second electrode layer, and/or (v) the second electrically conductive layer.

In various cases, the redox element includes an auxiliary electrode and a sequestration material, and the auxiliary electrode and/or the sequestration material may be located laterally adjacent to (i) the first electrically conductive layer, (ii) the first electrode layer, (iii) the ion conductor layer, (iv) the second electrode layer and/or (v) the second electrically conductive layer.

Passive Redox Element Embodiments

In some cases, an electrochromic (EC) device includes a passive redox element. In this disclosure, passive redox elements are distinguished from active redox elements by the fact that electrical potential is provided to passive redox elements through the two electrically conductive layers (and in some embodiments one or more electrodes) of the EC device. In contrast, electrical potential is provided to active redox elements through an auxiliary electrode (that is electrically isolated from the electrically conductive layers of the EC device) and one electrically conductive layer (and in some embodiments, one electrode) of the EC device.

One or more passive redox elements of an EC device can be made up of one or more sequestration materials in direct contact with the first and/or second electrode of the EC device (e.g., as shown in FIG. 2a). One or more passive redox elements of an EC device can also be made up of one or more sequestration materials in direct contact with the first and/or second electrically conductive layers of the EC device (e.g., as shown in FIG. 2b).

One or more passive redox elements of an EC device can have one or more sequestration materials in direct contact with the first and/or second electrode of the EC device (e.g., as shown in FIG. 2a), and be laterally adjacent to, or coplanar with the first and/or second electrodes of the EC device. One or more passive redox elements of an EC device can also have one or more sequestration materials in direct contact with the first and/or second electrically conductive layer of the EC device (e.g., as shown in FIG. 2b), and be laterally adjacent to, or coplanar with the first and/or second electrically conductive layers of the EC device.

One or more passive redox elements of an EC device can have one or more sequestration materials in direct contact with the first and/or second electrode of the EC device (e.g., as shown in FIG. 2a), and be approximately the same thickness as the first and/or second electrodes of the EC device. One or more passive redox elements of an EC device can have one or more sequestration materials in direct contact with the first and/or second electrically conductive layer of the EC device (e.g., as shown in FIG. 2b), and be approximately the same thickness as the first and/or second electrically conductive layers of the EC device.

One or more passive redox elements of an EC device can have one or more sequestration materials in direct contact with the first and/or second electrode of the EC device (e.g., as shown in FIG. 2a), and be from 2 to 20 times thicker than the first and/or second electrodes of the EC device. One or more passive redox elements of an EC device can have one or more sequestration materials in direct contact with the first and/or second electrically conductive layer of the EC device (e.g., as shown in FIG. 2b), and be from 2 to 20 times thicker than first and/or second electrically conductive layers of the EC device.

One or more passive redox elements of an EC device can have one or more sequestration materials deposited on the same substrate as the first and/or second electrode of the EC device (e.g., as shown in FIG. 2a). One or more passive redox elements of an EC device can have one or more sequestration materials deposited on the same substrate as the first and/or second electrically conductive layer of the EC device (e.g., as shown in FIG. 2b).

One or more passive redox elements of an EC device can have one or more sequestration materials deposited as layers with a top surface and a bottom surface, such that the bottom surface is in direct contact with the first and/or second electrode and the top surface is in direct contact with the ion conductor (e.g., as shown in FIG. 2a). One or more passive redox elements of an EC device can have one or more sequestration materials deposited as layers with a top surface and a bottom surface, such that the bottom surface is in direct contact with the first and/or second electrically conductive layer and the top surface is in direct contact with the ion conductor (e.g., as shown in FIG. 2b).

When redox element 102 is implemented as a passive redox element, multi-layer stack 101 can comprise redox element 102, and one or both electrodes of multi-layer stack 101 can comprise redox element 102.

The sequestration material may be incorporated as a component of the first electrode or the second electrode. For example, the sequestration material may be incorporated as a component of the first electrode layer 205 (FIG. 6) or the second layer 208 (FIG. 6) along with other electrochemically active materials. The sequestration material can be substantially transparent in each of the oxidation states in which the sequestration material may occur over the useful life of the electrochromic device.

Figure 7:
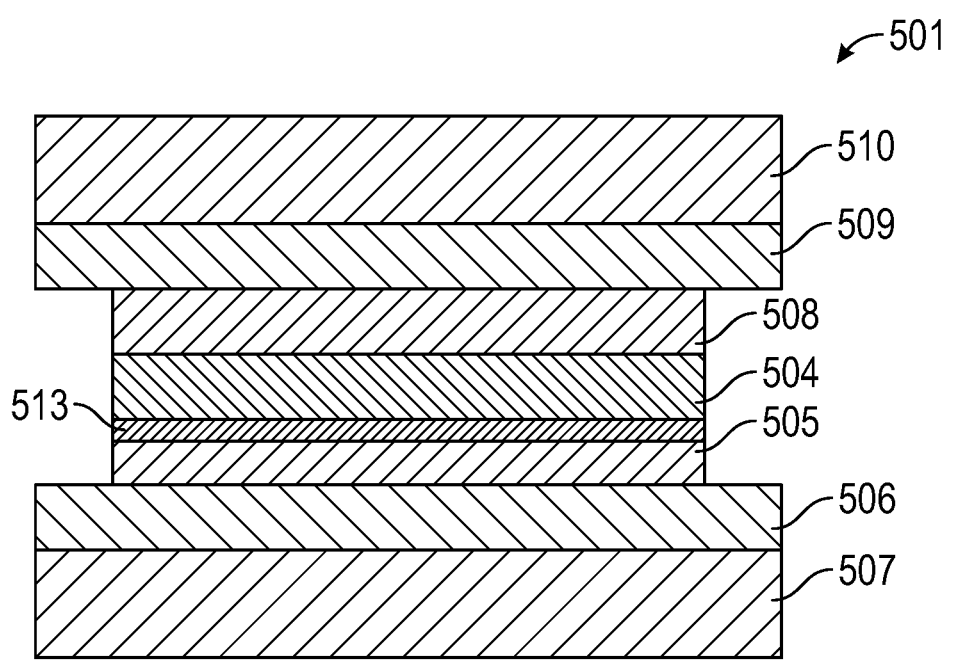
FIG. 7 is a schematic cross-section of a multi-layer electrochromic device with a redox element.

FIG. 7 illustrates a cross-sectional structural diagram of an exemplary multi-layer stack 501, according to an embodiment of a passive redox element. multi-layer stack 501 can be similar or identical to multi-layer stack 101 (FIG. 1) and/or multi-layer stack 201 (FIG. 6). Accordingly, multi-layer stack 501 can include ion conductor layer 504, first electrode layer 505, first electrically conductive layer 506, first substrate 507, second electrode layer 508, second electrically conductive layer 509, and second substrate 510. Further, multi-layer stack 501 can include sequestration material 513.

Figure 8:
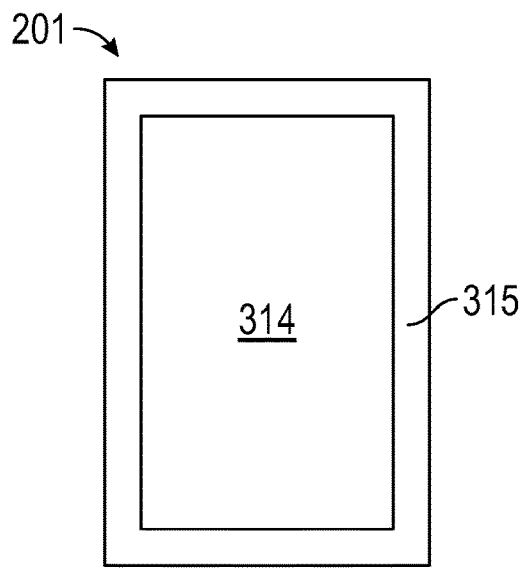
FIG. 8 is a top or bottom view an electrochromic device.

The sequestration material 513 can be located between first electrode layer 505 and ion conductor layer 504, as illustrated at FIG. 7, or between first electrode layer 505 and first electrically conductive layer 506. Sequestration material 513 can cover part or substantially all of a side of first electrode layer 505 proximal to sequestration material 513. Sequestration material 513 can be located at a viewing window of multi-layer stack 501. The viewing window can be similar or identical to the viewing window described above with respect to electrochromic device 100 (FIG. 1) and/or to viewing window 314 in FIG. 8. FIG. 8 illustrates a top or bottom view of multi-layer stack 201 (FIG. 6) including an exemplary viewing window 314 and an exemplary secondary portion 315, according to the embodiment of FIG. 1. Sequestration material 513 can be deposited over the first electrode layer 505 as a wet coating of a colloidal suspension of nanoparticles in a nonaqueous solution. Sequestration material 513 is electrically connected to first electrode layer 505 and is in ionic communication with ion conductor layer 504.

In general, in all embodiments, the redox element, and if present the sequestration material (e.g., 513), can be operable to compensate for operating electrical potential drift of one electrode layer (e.g., 505) that would otherwise result from spurious oxidation. For example, if left unchecked, operating electrical potential drift of one electrode layer (e.g., 505) can cause the state of charge of multi-layer stack (e.g., 501) corresponding to the optically more transmissive state to drift and become optically less transmissive. However, by applying an electrical potential of an appropriate magnitude to the redox element, the redox element can be reduced in a redox reaction to compensate for spurious oxidation and to prevent the electrical potential drift of one electrode layer (e.g., 505).

Active Redox Element Embodiments

In some cases, an electrochromic (EC) device includes an active redox element. In this disclosure, electrical potential is provided to active redox elements through an auxiliary electrode (that is electrically isolated from the electrically conductive layers of the EC device) and one electrically conductive layer (and in some embodiments, one electrode) of the EC device.

One or more active redox elements of an EC device can be made up of one or more auxiliary electrodes in direct contact with the first and/or second substrates of the EC device (e.g., as shown in FIG. 3).

One or more active redox elements of an EC device can have one or more auxiliary electrodes in direct contact with the first and/or second substrates of the EC device (e.g., as shown in FIG. 3), and be laterally adjacent to, or coplanar with the first and/or second electrodes and/or first and/or second electrically conductive layers of the EC device.

One or more active redox elements of an EC device can have one or more auxiliary electrodes in direct contact with the first and/or second substrates of the EC device (e.g., as shown in FIG. 3), and be approximately the same thickness as the first and/or second electrodes, or be approximately the same thickness as the first and/or second electrically conductive layers of the EC device.

One or more active redox elements of an EC device can have one or more auxiliary electrodes in direct contact with the first and/or second substrate of the EC device (e.g., as shown in FIG. 3), and be from 2 to 20 times thicker than the first and/or second electrodes of the EC device, or be from 2 to 20 times thicker than first and/or second electrically conductive layers of the EC device.

One or more active redox elements of an EC device can have one or more auxiliary electrodes deposited on the same substrate as the first and/or second electrically conductive layer of the EC device (e.g., as shown in FIG. 3).

One or more active redox elements of an EC device can have one or more auxiliary electrodes deposited as layers with a top surface and a bottom surface, such that the bottom surface is in direct contact with the first and/or second substrate and the top surface is in direct contact with the ion conductor (e.g., as shown in FIG. 3).

Redox element 102 can be separate from part or all of multi-layer stack 101, though being in communication (e.g., ionic communication) with and/or coupled (e.g., directly) to the electrodes of multi-layer stack 101. In these cases, redox element 102 can be implemented as an active redox element.

Enhanced Active Redox Element Embodiments

In some cases, an electrochromic (EC) device includes an enhanced active redox element. In this disclosure, enhanced active redox elements are distinguished from active redox elements by the fact that enhanced active redox elements include one or more sequestration materials in contact with the auxiliary electrode(s). As in the active redox element cases, electrical potential is provided to the enhanced active redox elements through an auxiliary electrode (that is electrically isolated from the electrically conductive layers of the EC device) and one electrically conductive layer (and in some embodiments, one electrode) of the EC device.

One or more enhanced active redox elements of an EC device can have one or more auxiliary electrodes in direct contact with the first and/or second substrates of the EC device, and one or more sequestration materials in contact with the auxiliary electrode (e.g., as shown in FIG. 4).

One or more enhanced active redox elements of an EC device can have one or more auxiliary electrodes in direct contact with the first and/or second substrates of the EC device and one or more sequestration materials in contact with the auxiliary electrode(s) (e.g., as shown in FIG. 4), and the auxiliary electrode and/or sequestration material is laterally adjacent to, or coplanar with the first and/or second electrodes and/or first and/or second electrically conductive layers of the EC device.

One or more enhanced active redox elements of an EC device can have one or more auxiliary electrodes in direct contact with the first and/or second substrates of the EC device, and one or more sequestration materials in contact with the auxiliary electrode(s) (e.g., as shown in FIG. 4). Additionally, the auxiliary electrode and/or sequestration material can be approximately the same thickness as the first and/or second electrodes, or can be approximately the same thickness as the first and/or second electrically conductive layers of the EC device.

One or more enhanced active redox elements of an EC device can have one or more auxiliary electrodes in direct contact with the first and/or second substrate of the EC device, and one or more sequestration materials in contact with the auxiliary electrode(s) (e.g., as shown in FIG. 4). Additionally, the auxiliary electrode(s) and/or sequestration material(s) can be from 2 to 20 times thicker than the first and/or second electrodes of the EC device, or can be from 2 to 20 times thicker than first and/or second electrically conductive layers of the EC device.

One or more active redox elements of an EC device can have one or more auxiliary electrodes deposited on the same substrate as the first and/or second electrically conductive layer of the EC device, and one or more sequestration materials in contact with the auxiliary electrode(s) (e.g., as shown in FIG. 4). One or more active redox elements of an EC device can also have one or more auxiliary electrodes deposited on the same substrate as the first and/or second electrically conductive layer of the EC device and one or more sequestration materials deposited on the auxiliary electrode(s) (e.g., as shown in FIG. 4).

One or more active redox elements of an EC device can have one or more auxiliary electrodes deposited as layers with a top surface and a bottom surface, and one or more sequestration materials are deposited as layers with a top surface and a bottom surface, such that the bottom surface of the auxiliary electrode is in direct contact with the first and/or second substrate and the top surface of the auxiliary electrode is in direct contact with the bottom surface of the sequestration material, and the top surface of the sequestration materials is in direct contact with the ion conductor (e.g., as shown in FIG. 4).

Redox element 102 can be separate from part or all of multi-layer stack 101, though being in communication (e.g., ionic communication) with and/or coupled (e.g., directly) to the electrodes of multi-layer stack 101. In these cases, redox element 102 can be implemented as an enhanced active redox element.

Organic Redox Element Embodiments

In some cases, an electrochromic (EC) device includes an organic redox element. In this disclosure, organic redox elements are distinguished from passive redox elements, active redox element and enhanced active redox elements by the fact that organic redox elements include one or more organic sequestration materials mixed with, or incorporated in the ion conductor. In some cases, electrical potential is provided to the organic redox element(s) through the two electrically conductive layers (and in some embodiments one or more electrodes) of the EC device. In some cases, electrical potential is provided to the organic redox element(s) through an auxiliary electrode (that is electrically isolated from the electrically conductive layers of the EC device) and one electrically conductive layer (and in some embodiments, one electrode) of the EC device.

One or more organic redox elements of an EC device can have one or more organic sequestration materials mixed with, or incorporated in the ion conductor, wherein the ion conductor is in direct contact with the first and/or second electrode of the EC device (e.g., as shown in FIG. 5a). One or more organic redox elements of an EC device can have one or more organic sequestration materials mixed with, or incorporated in the ion conductor, wherein the ion conductor is in direct contact with the first and/or second electrically conductive layers of the EC device (e.g., as shown in FIG. 5b).

One or more organic redox elements of an EC device can have one or more organic sequestration materials mixed with, or incorporated in the ion conductor and one or more auxiliary electrodes, wherein the auxiliary electrode(s) are in direct contact with the first and/or second substrate of the EC device (e.g., as shown in FIG. 5c).

One or more organic redox elements of an EC device can have one or more organic sequestration materials mixed with, or incorporated in the ion conductor and one or more auxiliary electrodes, wherein the auxiliary electrode(s) are in direct contact with the first and/or second substrate of the EC device (e.g., as shown in FIG. 5c), and the auxiliary electrode(s) are laterally adjacent to, or coplanar with the first and/or second electrically conductive layers and/or first or second electrodes of the EC device.

One or more organic redox elements of an EC device can have one or more organic sequestration materials mixed with, or incorporated in the ion conductor and one or more auxiliary electrodes, wherein the auxiliary electrode(s) are in direct contact with the first and/or second substrate of the EC device (e.g., as shown in FIG. 5c), and the auxiliary electrode(s) are approximately the same thickness as the first and/or second electrodes of the EC device.

One or more organic redox elements of an EC device can have one or more organic sequestration materials mixed with, or incorporated in the ion conductor and one or more auxiliary electrodes, wherein the auxiliary electrode(s) are in direct contact with the first and/or second substrate of the EC device (e.g., as shown in FIG. 5c), and the auxiliary electrode(s) are from 2 to 20 times thicker than the first and/or second electrodes of the EC device.

One or more organic redox elements of an EC device can have one or more organic sequestration materials mixed with, or incorporated in the ion conductor and one or more auxiliary electrodes, wherein the auxiliary electrode(s) are in direct contact with the first and/or second substrate of the EC device, and the auxiliary electrode(s) are deposited on the same substrate as the first and/or second electrode of the EC (e.g., as shown in FIG. 5c).

One or more organic redox elements of an EC device can have one or more organic sequestration materials mixed with, or incorporated in the ion conductor and one or more auxiliary electrodes, wherein the auxiliary electrode(s) are in direct contact with the first and/or second substrate of the EC device, and the auxiliary electrode(s) are deposited as layers with a top surface and a bottom surface, wherein the bottom surface is in direct contact with the first and/or second substrate and the top surface is in direct contact with the ion conductor (e.g., as shown in FIG. 5c).

When redox element 102 is implemented as an electrode-based organic redox element, multi-layer stack 101 can include redox element 102. In these cases, one or both electrodes of multi-layer stack 101 can include redox element 102.

In certain cases, an electrode-based organic sequestration material may be incorporated as a component of the first electrode and/or the second electrode. For example, the organic sequestration material may be incorporated as a component of the first electrode layer 205 (FIG. 6) or the second electrode layer 208 (FIG. 6) along with other electrochemically active materials. In some cases, the sequestration material is substantially transparent in each of the oxidation states in which the sequestration material may occur over the useful life of the electrochromic device.

When redox element 102 is implemented as an organic redox element, multi-layer stack 101 can include redox element 102. The ion conductor of multi-layer stack 101 can also include redox element 102. When the ion conductor of multi-layer stack 101 includes redox element 102, the redox element can be configured to freely diffuse in the ion conductor material.

The organic sequestration material can also be incorporated as a component of the ion conductor layer 204 (FIG. 6) along with other polymer/electrolyte compositions comprised by the ion conductor layer. In some cases, the sequestration material can be incorporated as a component of the ion conductor layer 204 (FIG. 6) and is substantially transparent in each of the oxidation states in which the sequestration material may occur over the useful life of the electrochromic device.

In some cases there is more than one redox element in an EC device. In some cases, there are two, or 3, or 4, or 5, or 6, or 7, or 8, or 9, or 10, or more than 10, or from 10 to 20 redox elements in an EC device, where one or more contain organic sequestration materials.

Mixed Redox Element Embodiments

In some cases, an electrochromic device includes more than one redox element of different types. In other words, an electrochromic device includes one or more passive redox elements, and/or one or more active redox elements, and/or one or more enhanced active redox elements, and/or one or more organic sequestration elements.

In some cases, there are two, or 3, or 4, or 5, or 6, or 7, or 8, or 9, or 10, or more than 10, or from 10 to 20 redox elements of different types in an EC device. In some cases, there are two, or 3, or 4, or 5, or 6, or 7, or 8, or 9, or 10, or more than 10, or from 10 to 20 redox elements of different types in an EC device, wherein each has its own external control circuit. In some embodiments, there are two, or 3, or 4, or 5, or 6, or 7, or 8, or 9, or 10, or more than 10, or from 10 to 20 redox elements of different types in an EC device redox elements that are shorted together and controlled through a single external control circuit. In some cases there are multiple different active redox elements of different types on the same substrate, each controlled with their own auxiliary electrode connected to external control circuitry. In some cases there are multiple different active redox elements of different types on more than one substrate, each controlled with their own auxiliary electrode connected to external control circuitry.

For example, an electrochromic device can include an enhanced active redox element with an auxiliary electrode and a sequestration material in contact with the auxiliary electrode, and additionally include an organic redox element having an organic sequestration material mixed with, or incorporated in, the ion conductor layer.

In other cases, there are two or more redox elements, one or more on the first substrate and one or more on the second substrate. For example, in an electrochromic device described herein, one redox element shares a substrate with the first electrically conductive layer and first electrode, and the second redox element shares a substrate with the second electrically conductive layer and second electrode.

Electrochromic Devices with Redox Elements Used to Establish Initial States

In some materials systems for electrochromic multi-layer stacks, the initial redox and optical state of two electrochromic electrodes is not matched initially following device fabrication. One example of such a situation is Prussian Blue (PB) and tungsten trioxide, where the stable oxidized state of tungsten trioxide is clear, but the stable oxidized state of PB is blue. Prussian blue (PB) is an anodically coloring compound used as anode in electrochromic devices which can be reduced to the colorless Evertt's salt (ES) by insertion of a cation (e.g., H+, Li+, Na+, K+). The desired initial state of PB in an electrochromic device is the colorless Everett's salt, to match with the initially colorless $WO_3$ cathode to obtain a device with a matched bleached state. However, the air stable form of PB is the oxidized form, blue colored Prussian blue. Therefore, under ambient atmospheric process conditions, the initial state of the PB will be oxidized and blue, while the $WO_3$ is oxidized and colorless. Since oxygen-free processing adds significant cost and complexity to the production process, it is advantageous to have a device and method for reducing the PB in situ (i.e., inside the device) after it is fabricated and sealed. Therefore, under certain processing routes, the initial optical states of the PB and the tungsten trioxide in the electrochromic multi-layer stack are not matched. There are other EC materials that suffer from the same problem as the PB/$WO_3$ system as well. Devices including some Prussian blue analogs could benefit, such as those including the Nitroprusside anion. Many EC materials have initial optical states that could be improved by an initial oxidation or reduction using a redox element, due to the fact that the initial states are slightly less oxidized or reduced than is most desirable. In some cases, the initial state of a cathode has some unwanted optical absorption, and could be made more transmissive by further oxidation. In some cases, the initial state of an anode has some unwanted optical transmission, and could be made less transmissive by further reduction.

In some embodiments, there are two electrochromic electrodes that are initially oxidized with optical states that are not initially matched, and there is a redox element that is used to reduce one of the electrochromic materials, and match the initial optical state of the two electrodes. In some embodiments, there are two electrochromic electrodes that are initially reduced with optical states that are not initially matched, and there is a redox element that is used to oxidize one of the electrochromic materials, and match the optical state of the two electrodes.

In some cases, a redox element incorporated in an electrochromic device that is used to change an initial state of one or more layers may only be oxidized and/or reduced outside the normal voltage range of the device. For example, upon application of the more negative bias voltage (i.e., cell potential) than the voltage normally reached during cycling, the redox element would be oxidized and the anode would be reduced. Alternatively, upon application of the more positive bias voltage than the voltage normally reached during cycling, the redox element would be reduced and the cathode would be oxidized.

In some cases, the redox potential of the redox element is tuned such that the oxidation or reduction of the redox element occurs outside of the normal operating bias range of the electrochromic device, but not so far outside the range that other materials in the device are degraded. In other words, the redox potential of the redox element is between the normal operating bias range of the device and the potential that will degrade the other materials in the device (e.g., the ion conductor, electrodes, and transparent conducting layers).

In some cases, the redox elements will have redox potentials (when converted to the Li/Li+ potential) from 3.9 to 4.8 V, or from 3 to 5 V, or from 3.5 to 5 V, or from 4 to 5 V. In some cases, the redox elements will be reduced or oxidized at a cell potential from −0.5 to −1 V, or from −1 to −1.5 V, or from −1.5 to −2 V, or from −2 to −2.5 V, or from −2.5 to −3 V, or from −3 to −3.5 V, or from −3.5 to −4.0 V, or from −0.5 to −4.0 V, or from 0.5 to 1 V, or from 1 to 1.5 V, or from 1.5 to 2 V, or from 2 to 2.5 V, or from 0.5 to 2.5 V.

The redox element incorporated to match the initial states of the electrodes can be a passive redox element, an active redox element, an enhanced active redox element, or an organic redox element, where the organic redox element can be active or passive (i.e., with or without an auxiliary electrode).

When the redox element is used to match the initial states of the electrodes, the redox reaction does not need to be reversible. This is because the redox element is used to correct the initial state, which is a one-time event. After the redox element is used to reduce or oxidize the electrochromic electrode, it can be rendered inactive (e.g. by dimerization, or reaction with the ion conductor).

Alternatively, in some of these cases, the redox element will be able to be oxidized/reduced many times without being rendered inactive. In some cases, a redox element can be used to match the optical states of the electrochromic electrodes initially, and will also subsequently be used to mitigate or prevent performance degradation of the electrochromic device resulting from faradic losses throughout the lifetime of the device.

In some cases, in many different embodiments, the reduction or oxidation of the electrochromic electrodes via the redox element, resulting from an applied potential outside of the normal operating voltage range of the device, occurs quickly. In some embodiments, the reduction or oxidation of the electrochromic electrodes via the redox element, resulting from an applied potential outside of the normal operating voltage range of the device, changes the transmission at 550 nm or Tvis by more than 0.1%, or more than 0.5%, or more than 1%, or more than 2%, or more than 4%, or more than 6%, or more than 10%, or more than 20%, or more than 30%, or more than 40%, or more than 50%, or more than 60%, or more than 70%, or more than 80% in less than 24 hours, or less than 12 hours, or less than 6 hours, or less than 2 hours, or less than 1 hour, or less than 30 minutes, or less than 15 minutes, or less than 10 minutes, or less than 5 minutes, or less than 2 minutes.

Materials of Electrochromic Devices with Redox Elements

In implementation, the ion conductor of multi-layer stack 101 is made up of an ion conductor material, which can be an organic ion conductor material (e.g., an organic electrolyte, such as, for example, a ketone, a diketone, etc.) or an inorganic ion conductor material (e.g., an inorganic electrolyte). The ion conductor material can be implemented as molecules, clusters, or nanoparticles. For example, the ion conductor material can comprise a polymer material.

Further, the electrically conductive elements of the EC devices herein can include any suitable electrically conductive materials (e.g., metal, carbon, transparent conductive oxides, etc).

In some EC devices described in this disclosure, the first electrode material can include a nickel oxide and the second electrode material can include a tungsten oxide.

In some examples, the electrode of multi-layer stack 101 that is operable as an anodic electrode is made up of an anodically active material (e.g., an oxide material, such as, for example, a metal oxide material comprising tungsten, titanium, molybdenum, bismuth, cobalt, iridium, niobium, ruthenium, tantalum, tin, etc.; a cyanometallate material; a viologen material; a conjugated polymer material; a molecular organic material; a metal hydride material; etc.); and the electrode of multi-layer stack 101 that is operable as a cathodic electrode is made up of a cathodically active material (e.g., an oxide material, such as, for example, a metal oxide material comprising nickel, praseodymium, vanadium, rhodium, etc.; a cyanometallate material; a viologen material; a conjugated polymer material; a molecular organic material; etc.).

In various examples, the auxiliary electrode(s) can include at least one of a fluorocarbon material, a sulfide material, an oxide material, or a metal material. In some examples, the auxiliary electrode(s) themselves are the material(s) that sequesters charge. In some cases, the auxiliary electrode is made up of the same material as the first or second electrically conductive material.

In various examples, the materials forming the redox element, auxiliary electrode and/or sequestration material can be selected from the following group: a fluorocarbon material (e.g., $CF_x$ where x is ~0.95-~1.15), a sulfide material (e.g., Manganese Sulfide, Iron Sulfide, Cobalt Sulfide, Nickel Sulfide, Copper Sulfide) an oxide material (e.g., Tin Oxide, Antimony Oxide, Zinc Oxide, Tantalum Oxide, Cerium Oxide, Copper Oxide, Manganese Oxide, Molybdenum Oxide, Iron Oxide, Vanadium Oxide, Cobalt Oxide, Nickel Oxide, and mixed metal and doped oxides such as Indium Tin Oxide, Aluminum Zinc Oxide, Aluminum doped Zinc Oxide, Indium Zinc Oxide, Fluorine Tin Oxide, Zinc Iron Oxide, Zinc Manganese Oxide, Zinc Cobalt Oxide, Cobalt Manganese Oxide, Nickel Manganese Oxide, Lithium Titanium Oxide, Lithium Vanadium Oxide, Lithium Iron Silicon Oxide, Lithium Iron Manganese Silicon Oxide, Lithium Manganese Oxide, Lithium Cobalt Oxide, Lithium Nickel Cobalt Aluminium Oxide, Lithium Nickel Cobalt Manganese Oxide, Sodium Nickel Tin Oxide), Lithium iron fluorosulfate, Lithium manganese fluorosulfate, Lithium iron fluorophosphate, Lithium manganese fluorophosphates, phosphate and other battery-related materials (e.g. Lithium Iron Phosphate, Lithium Manganese Phosphate, Lithium Vanadium Phosphate, Carbon, Sulfur, Silicon, Copper Fluoride, Iron Fluoride) metals and metal alloys (e.g., Platinum, Copper, Nickel, Tin, Iron, Antimony, Manganese), or one or more polymers or other organic moieties. For example, the sequestration material can comprise $CF_x$ (wherein x is 0.85-1.15), $MnO_2$, $Mo_2O_3$, $Sb_2O_5$, or a polymer or polymer blend. Further examples of some specific materials, the materials forming the redox element can be selected from the group comprising: a fluorocarbon material (e.g., $CF_x$ where x is ~0.95-~1.15), a sulfide material (e.g., MnS, $MnS_2$, FeS, CoS, NiS, CuS, $Cu_2S$, etc.) an oxide material (e.g., $SnO_2$, $Sb_2O_3$, $Sb_2O_5$, ZnO, $CeO_2$, CuO, $Cu_2O$, MnO, $Mn_2O_3$, $Mn_3O_4$, $MnO_2$, $Mo_2O_3$, FeO, $Fe_2O_3$, $Fe_3O_4$, CoO, $Co_3O_4$, NiO, $ZnFe_2O_4$, $ZnMn_2O_4$, $ZnCo_2O_4$, $CoMn_2O_4$, $NiMn_2O$, etc.), a metal material (e.g., platinum, etc.), or one or more polymers or other organic moiety.

In some examples where an organic sequestration material is reduced to sequester charge from one of the electrodes by oxidizing the electrode, the materials forming the organic sequestration material can be selected from the following group: n-haloalkanes (e.g., 1,1,2,2-tetrabromoethane, 1,2-diiodoethane, halothane, 1,1,1,2,2,3,3-heptachloropropane, 1,2-dibromotetrachloroethane), cyclic-haloalkanes or cyclic-haloalkenes (e.g., HCH, sucralose, pentachlorocyclopropane, tetrachlorocyclopropene, octachlorocyclopentene, alodane, dienochlor), n-haloalkenes (e.g., 2,3-dichloro-1-propene, hexachloropropene, hexachloro-1,3-butadiene), haloethers (e.g., 1,2,2,2-tetrachloroethyl ether, chloromethyl Methyl Ether, dichloromethyl methyl ether, isoflurane, bis (2,3,3,3-tetrachloropropyl) ether, bromomethyl acetate, bromomethyl methyl ether), haloacetones or haloketones or haloesters or halocarbonates (e.g., triphosgene, methyl 2,2-dichloro-2-methoxyacetate, methyl 2,3-dibromopropionate, 1,3-dichloroacetone, 1,1,1-trichloroacetone, hexachloro-2-propanone, 2,4-dibromo-2,4-dimethyl-3-pentanone, 3-bromo-1,1,1-trifluoroacetone, methyl 2,3-dibromopropionate, bromomethyl acetate), or halophosphates (e.g., bromochlophos).

In some examples where an organic sequestration material is oxidized to sequester charge from one of the electrodes by reducing the electrode, the materials forming the organic sequestration material can be selected from the following group: dimethoxybenzene derivatives, benzene derivatives or anisole derivatives, with from 0 to 6 halogen-containing and/or alkyl ligands. Some examples from these groups are 2-ethynylanisole, 1-cyclopropyl-2-methoxybenzene, 3-ethynylanisole, 4-ethynylanisole, 1-(3-(2,4-cyclopentadienlylidene)-1-butenyl)-4-methoxybenzene, 3-bromoanisole, 4-bromoanisole, 2,4,6-tribromoanisole, 2,5-dichloroanisole, 2-bromo-4-fluoroanisole, 5-tert-butyl-1,3-dinitro-2-methoxybenzene, 4-tert-butyl-2,6-diaminoanisole, 2-tert-butyl-4,6-dinitro-5-methylanisole, 3-amino-N-dodecyl-4-methoxybenzsulfoamide, 1,4-dimethoxybenzene, 1,2-dimethoxybenzene, 4-allyl-1,2-dimethoxybenzene, 2,5-bis(chloromethyl)-1,4-dimethoxybenzene, 2,4-bibromo-1,3-dimethoxybenzene, 1,2,3,4-tetrabromo-5,6-dimethoxybenzene, 1,2,4,5-tetrabromo-3,6-dimethoxybenzene, 1,2-dimethoxy-4-nitrobenzene, 2-ethoxyanisole, 1,4-diethoxybenzene, hexadecyloxy-4-methoxybenzene, 4-[((2-ethyl)hexyl)oxy]anisole, 3-methoxy-1,2-benzenediol, 1,3,5-trimethoxybenzene, N,N-dimethylaniline, N,N-dimethyl-p-toluidine, benzene, 1,3,5-triethylbenzene, 1,2,4,5-tetramethylbenzene, hexaethylbenzene, thianthrene, and pyrene. The materials in the previous list are a subset of materials previously identified as failed redox shuttles in the battery literature. [Buhrmester et al., Journal of The Electrochemical Society, 152 (12) A2390-A2399 (2005)]

In some cases, the materials forming the redox element used to initially match the states of the electrochromic layers are sequestration materials in passive, active, or enhanced active redox element embodiments, or are organic sequestration materials in organic redox element embodiments. In some cases, the organic sequestration materials could be dimethoxybenzene derivatives, benzene derivatives and anisole derivatives, and can also have from 0 to 6 halogen-containing and/or alkyl ligands, or any of the specific organic sequestration materials listed above.

In some examples the materials forming the redox element used to initially match the states of the electrochromic layers can be synthetic or natural antioxidants. These materials are typically able to oxidize or reduce the anode or cathode with zero volts applied bias, and are therefore examples of materials that can operate within the normal operating voltage range of the device. Some examples of materials forming the redox element used to initially match the states of the electrochromic layers, within the normal operating range of the device or at zero applied bias, are ascorbic acid and ascorbate salts (such as potassium ascorbate).

Sequestration material (e.g., 513) can be operable as a passive redox element as described above with respect to electrochromic device 100 (FIG. 1). Further still, sequestration material (e.g., 513) can be (i) substantially transparent and/or (ii) at least partially irreversibly reducible in a redox reaction. For example, the sequestration material can be diantimony pentoxide ($Sb_2O_5$) or dicopper oxide ($Cu_2O$). In particular, diantimony pentoxide ($Sb_2O_5$) can be implemented for the sequestration material because it can be substantially irreversibly reduced in an electrical potential range above an electrical potential range of first electrically conductive layer (e.g., 506) and below that of first electrode layer (e.g., 505) when multi-layer stack (e.g., 501) is at the optically more transmissive state (e.g., a range of applied electrical potentials versus lithium/lithium-ion that are less than or equal to approximately 2.9 Volts and greater than or equal to approximately 1.3 Volts). Meanwhile, when diantimony pentoxide ($Sb_2O_5$) is implemented for the sequestration material, an applied electrical potential above approximately 1.5 Volts may not significantly impact the transmittance of the sequestration material (e.g., 513), and the sequestration material is substantially irreversible. Accordingly, sequestration material (e.g., 513) can be operable for a range of applied electrical potentials less than or equal to approximately 2.9 Volts and greater than or equal to approximately 1.3 Volts.

In some cases, multi-layer stack 101 can include one or more binder materials. One or more of the binder material(s) can also couple together two or more of the ion conductor of multi-layer stack 101, the first electrode of multi-layer stack 101, the second electrode of multi-layer stack 101, the first electrically conductive element of multi-layer stack 101, the second electrically conductive element of multi-layer stack 101, and redox element 102. One or more of the binder material(s) can also couple together the sequestration material, auxiliary electrode of redox element 102, the ion conductor material of the ion conductor of multi-layer stack 101, the anodically active material, the cathodically active material, the anodic electrochromic material, and/or the cathodic electrochromic material of multi-layer stack 101.

In some cases, the binder material(s) can include an electrically conductive material (e.g., carbon black, nanoparticles, etc.) and/or an ionically conductive material (e.g., polymer, polymer gel, nanoparticles, etc.).

In some examples, the substrates of multi-layer stack 101 are any suitable substrate material(s), such as one or more electrically insulating materials (e.g., glass or polymers). In some embodiments, the substrates comprise the same or different substrate material(s). Such substrates include, for example, glass, plastic, metal, and metal coated glass or plastic. Non-exclusive examples of possible plastic substrates are polycarbonates, polyacrylics, polyurethanes, urethane carbonate copolymers, polysulfones, polyimides, polyacrylates, polyethers, polyester, polyethylenes, polyalkenes, polyimides, polysulfides, polyvinylacetates and cellulose-based polymers. If a plastic substrate is used, it may be barrier protected and abrasion protected using a hard coat of, for example, a diamond-like protection coating, a silica/silicone anti-abrasion coating, or the like, such as is well known in the plastic glazing art. Suitable glasses include either clear or tinted soda lime glass, including soda lime float glass. The glass may be tempered or untempered. The glass substrate may also include a barrier or coating, such as a sodium diffusion barrier.

In some cases, an electrochromic device with a redox element, also has one or more electrically conductive layers that have spatially varying properties. In some cases, an electrochromic device with a redox element has a first and second electrically conductive layer, and the sheet resistance of one or both of the first and second electrically conductive layers is spatially varying. In some cases, an electrochromic device with a redox element has a first and second electrically conductive layer, and one or both electrically conductive layers are patterned. In some cases, an electrochromic device with a redox element has a first and second electrically conductive layer, and the properties (for example resistivity and/or doping density) or structure (for example thickness and/or ablated pattern) of the electrically conductive layers are varying in such a way to cause a spatially varying sheet resistance, or non-linear resistance as a function of distance through the sheet.

Methods of Manufacturing Electrochromic Devices with Redox Elements

As discussed above, redox elements can be used to improve the durability of electrochromic devices. Durability is of paramount importance to commercial products. Another critical attribute of commercial products is that they be manufactured at low cost. And therefore, low cost manufacturing methods are also critical for redox elements that are to be incorporated commercial products.

In some cases the redox element or portions of the redox element can be manufactured by mechanical or laser scribing, and/or selective area deposition. Such manufacturing methods are well suited to produce devices with redox elements or portions of redox elements that are electrically isolated. For example, FIG. 3 illustrates an embodiment of a redox element with an electrically isolated auxiliary electrode 121. FIG. 4 shows an embodiment of a redox element with an electrically isolated auxiliary electrode 121 and a sequestration material 120. FIG. 5c also illustrates an embodiment of a redox element with an electrically isolated auxiliary electrode 121 in conjunction with an organic sequestration material.

Laser Scribing Methods for Electrical Isolation of Redox Elements

In some cases, the redox element can be processed by laser scribing. Laser scribing is a cost-effective manufacturing process for creating an electrically isolated redox element within an electrochromic device, such as a window or mirror. In some cases, laser scribing can be used in concert with selective area coating of the auxiliary electrode or the sequestration material, or both.

The first and/or second electrode can be processed by laser scribing to create a passive redox element. In such cases, some electrode material is removed with laser scribing to expose a region of electrically conductive material upon which a sequestration material can be deposited (e.g., as shown in FIG. 2b).

The redox element or sequestration material can also be processed by other low cost patterning approaches, for instance mechanical scribing or selective area deposition without scribing.

The first and/or second electrode can be processed by other low cost patterning approaches, for instance mechanical scribing or selective area deposition without scribing, to leave an area of electrically conductive material uncovered by the electrode, upon which a sequestration material can be deposited (e.g., as shown in FIG. 2b).

In some cases, a layer of electrically conductive material can be deposited, and then laser scribed to isolate the electrically conducting layer of the multi-layer stack from the electrically isolated section which can be utilized as a portion of the redox element. For instance, the portion of the redox element can be the auxiliary electrode, and/or sequestration material of an enhanced active redox element. The layer of electrically conductive material can be transparent. In some examples, the electrically conductive material that is isolated to become part, or all, of the redox element is a transparent conducting oxide (TCO), such as indium tin oxide (ITO), fluorine-doped tin oxide (FTO), aluminum-doped zinc oxide (AZO), or indium zinc oxide (IZO).

In some cases, a portion of the redox element (e.g., the auxiliary electrode, and/or sequestration material of an enhanced active redox element) is electrically isolated from the electrically conductive layers and/or electrode layers by laser scribing. It is critical for the laser scribe and laser scribing process of such a portion of the redox element to achieve effective electrical isolation at a fast scan rate. Electrical isolation is required to make the redox element function properly, as a separately controllable electrode. The scan rate sets the time it will take to scribe the layer, and therefore affects manufacturing cost. The laser spot size, power density, wavelength, and pulse repetition rate can be chosen to achieve a given scan rate and channel width to achieve appropriate electrical isolation of the redox element. The electrical isolation resistance of such a portion of the redox element must be greater than 2 Mohms, or greater than 5 Mohms, or greater than 10 Mohms, or greater than 20 Mohms, or be from 2 to 20 Mohms, or be from 2 to 10 Mohms, or be from 10 to 20 Mohms.

The goal of laser scribing is to achieve electrical isolation of a portion of the redox element by creating a channel that is free of conductive material. The channel is created by removing material using the laser, which is accomplished by having a laser intensity (Watts/cm$^2$), which is the result of a combination of spot size and pulse energy and duration, above the threshold for ablation of the material. The energy can come from two, or three, or multiple pulses that spatially overlap each other as the laser is scanned across the material. A certain overlap is required to ensure isolation. The spatial overlap of the laser pulses making up the scribe to isolate a portion of the redox element can vary from 30% to 98% depending on the laser power, pulse repetition rate, and scan speed. The spatial overlap of the laser pulses comprising the scribe to isolate a portion of the redox element can be 85%. As the fraction of overlap between pulses increases, the electrical isolation resistance will generally increase, but the more total power will be necessary to create the scribe.

The laser used to create the scribe to isolate a portion of the redox element can have a wavelength of 355 nm, 532 nm or 1064 nm, since there are low cost lasers available in these wavelengths. The critical parameter to consider is that the material being ablated absorbs light at the laser wavelength.

The scan rate of the laser to create the scribe to isolate a portion of the redox element can vary from 100 mm/s to 1 m/s, or from 1 m/s to 5 m/s. The scan rate is set to achieve the required process time. For a given process time, the repetition rate, spot size and power per pulse needs to be tuned to obtain the desired channel width and depth, and achieve effective electrical isolation.

The channel width of the scribed line to isolate a portion of the redox element can be from 10 to 200 microns with very good electrical isolation, or can be from 30 to 50 microns to achieve very good isolation. The larger the channel the more power is required from the laser, which will add cost and reduce the area of the isolated redox element. Smaller channels, however, require greater laser stability and process control.

In one example, the type of laser used to create the scribe to isolate a portion of the redox element is a 1064 nm wavelength, power q-switched diode-pumped solid state Nd-vanadate laser. In another example, to create the scribe to isolate a portion of the redox element a 1064 nm wavelength Nd:YAG laser is used. Processing speed, or throughput, is important in manufacturing applications. In some cases, high repetition rates are used to obtain fast scribing to isolate a portion of the redox element. For example, the laser used to create the scribe to isolate a portion of the redox element can have repetition rates from 75-100 kHz, or from 100-200 kHz, or from 200-1000 kHz. The pulse width is also a critical parameter. For example, the laser used to create the scribe to isolate a portion of the redox element can have pulse width from 10-50 ns, or from 1-10 ns, or from 50-500 ns. In some examples, the laser used to create the scribe to isolate a portion of the redox element can have an average power from 10-20 W, or from 250-600 mW, or from 10-20 W, or from 1-10 W, or from 500 mW to 1 W. The combination of laser parameters are generally chosen to maintain conditions where the material being scribed will be ablated.

In some examples, the laser used to create the scribe to isolate a portion of the redox element, is a picosecond-pulsed laser. For example, the laser used to create the scribe to isolate a portion of the redox element can be a 1064 nm wavelength laser with a pulse width from 20-40 ps, and a repetition rate of about 1 MHz. The laser used to create the scribe to isolate a portion of the redox element can have a pulse width from 10-100 ps, and a repetition rate from 100 kHz to 10 MHz.

In some examples, the laser used to create the scribe to isolate a portion of the redox element can be a continuous-lamp-pumped laser, Q-switched Nd:YAG laser with wavelengths of 1064 nm and 532 nm, a flashlamp-pumped-Nd:YAG laser with wavelengths of 532 or 1064 nm, a copper-vapor laser with wavelengths 511 and 578 nm, a XeCl-excimer laser with wavelength of 308 nm, a KrF-excimer laser with wavelength of 248 nm, or a mode-locked diode-laser-pumped Nd:YAG laser. In different examples, the laser used to create the scribe to isolate a portion of the redox element can have different pulse durations, depending on wavelength, power and desired scan rate. In some examples, the laser used to create the scribe to isolate a portion of the redox element can have pulse durations in the range of 0.1 to 1000 ns, or 0.1 to 100 ns, or 0.1 to 10 ns, or 0.1 to 1 ns, or 1 to 1000 ns, or 1 to 100 ns, or 1 to 10 ns, or 10 to 1000 ns, or 10 to 100 ns, or 100 to 1000 ns.

Pulse-to-pulse stability and beam quality are important to realize a clean scribe and a consistent, repeatable process to create the scribe to isolate a portion of the redox element. Based on the above laser parameters, the laser used to create the scribe to isolate a portion of the redox element a scribing speed of 1-2 m/s can be effectively realized. The application of flat top beam shaping optics also aids in achieving higher scribing speed by decreasing the beam overlap needed for scribing.

In some cases, to create the scribe to isolate a portion of the redox element, the sample can be oriented with the electrically conductive layer facing down and the incident laser light passes through the glass, which does not absorb that wavelength of light. In some cases, to create the scribe to isolate a portion of the redox element, the electrically conductive layer can be facing down, and the laser incident on the layer from below. In some cases, to create the scribe to isolate a portion of the redox element, the electrically conductive layer can be facing up and the laser incident on the layer from above.

In some cases, the electrical isolation of a portion of the redox element can be achieved by methods other than laser scribing. The electrical isolation of a portion of the redox element can be achieved by mechanically scribing, or a photolithography patterning technique. For example, the electrically conductive layer (e.g., a TCO material) could be deposited, and the material mechanically scribed, or patterned by a photolithography technique to isolate the portion of the film designated as the auxiliary electrode. The key feature is generally that such a portion of the redox element is electrically isolated from the electrically conductive layers and electrode layers.

In some cases, the materials comprising the redox element or a portion of the redox element can be deposited separately from the electrically conductive layers and/or electrode layers. For example, the electrically conductive layer (e.g., a TCO material) in an electrochromic device can be deposited via sputtering while the area designated for the redox element is masked to prevent deposition in that region, and the redox element or a portion of the redox element can be deposited in the area designated for the redox element while the rest of the area forming the multi-layer stack is masked.

Multi-Layer Stack Deposition Methods with Redox Elements

When the ion conductor of multi-layer stack 101, the electrodes of multi-layer stack 101, the electrically conductive elements of multi-layer stack 101, the substrates of multi-layer stack 101, and/or redox element 102 are implemented as layers, the ion conductor of multi-layer stack 101, the electrodes of multi-layer stack 101, the electrically conductive elements of multi-layer stack 101, and/or redox element 102 can be manufactured using any suitable material deposition techniques (e.g, screen printing, doctor blade printing, inkjet printing, rolling coating, sputter coating, etc.).

In various cases, the layers comprising the multi-layer stack and redox element can be deposited using various deposition methods. For example, the electrically conductive layers, electrode layers, and/or ion conductor can be solution coated, sputtered, or evaporated. The solution coating methods for the layers in the multi-layer stack and redox element can be sol-gel coating, coating a colloidal suspension of nanoparticles, or other methods utilizing solution-based precursors to coat a thin film. In fact, the layers in the multi-layer stack and redox element can be manufactured using any suitable material deposition techniques. Some non-limiting examples of layer deposition techniques are screen printing, doctor blade printing, inkjet printing, slot die coating, capillary coating, rolling coating, sputter coating, evaporation, pulsed-laser deposition, chemical vapor deposition, molecular beam epitaxy, or atomic layer deposition.

In some cases, solution coating is used to process one or more layers with selective area coating. One example of selective area solution coating is slot die coating with shims to confine the deposition of the material to certain regions. Another example of selective area solution coating is spray coating with nozzles configured to selectively deposit material in certain regions. There are many other selective area solution coating methods that can be used to form the structures discussed herein.

In some cases, redox element 102 includes a sequestration material, and the sequestration material is included in the first or second electrode, and/or the sequestration material is deposited in the precursor solution(s) of the electrode(s) during manufacturing. In some cases, the redox element 102 is made up of an organic sequestration material, the organic sequestration material is included in the ion conductor of multi-layer stack 101, and the organic sequestration material is deposited in the precursor solution of the ion conductor during manufacturing. Further, in some cases, the precursor solution is thermally cured, optically cured (e.g., by ultra-violet light), and/or chemically cured.

Figure 9:
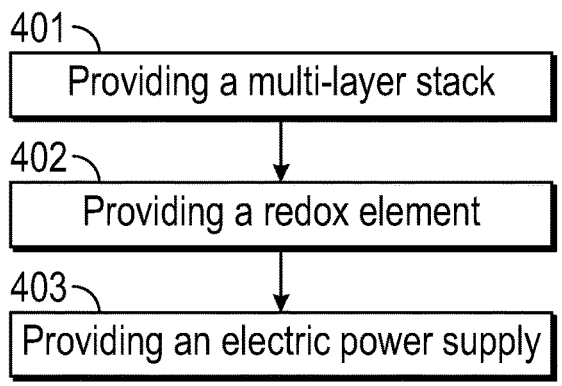
FIG. 9 is a flow chart for an embodiment of a method of providing an electronic device.

FIG. 9 illustrates a flow chart for an embodiment of method 400 of providing an electronic device. In this method, a multi-layer stack is provided (step 401), the multi-layer stack is provided with a redox element (step 402), and the multi-layer stack is provided with an electric power supply (step 403). Method 400 is merely exemplary and is not limited to the embodiments presented herein, or limiting to the embodiments presented herein. Method 400 can be employed in many different embodiments or examples not specifically depicted or described herein. In some embodiments, the activities of method 400 can be performed in the order presented. In other embodiments, the activities of method 400 can be performed in any other suitable order. In still other embodiments, one or more of the activities in method 400 can be combined or skipped.

In many embodiments, method 400 can include activity 401 of providing a multi-layer stack. The multi-layer stack can be similar or identical to multi-layer stack 101 (FIG. 1) and/or multi-layer stack 201 (FIG. 6).

Further, method 400 can include activity 402 of providing a redox element. The redox element can be similar or identical to redox element 102 (FIG. 1). In some embodiments, activity 402 can be performed as part of activity 401.

Further still, method 400 can include activity 403 of providing an electric power supply. The electric power supply can be similar or identical to electric power supply 103 (FIG. 1).

Architectures for Electrochromic Devices with Redox Elements

In some cases the electrochromic device can be an architectural window, or an insulated glass unit (IGU). In windows, the redox element can hidden in the frame of the window. In some cases, the redox element is at the edge of the device. In some cases, the redox element is confined to a small area, which is only a fraction of the area of the device.

In some cases, when multi-layer stack 101 includes redox element 102, redox element 102 can be located inside or outside of a viewing window of multi-layer stack 101. For example, the redox element 102 can be located inside or outside of a viewing window of multi-layer stack 101 when the ion conductor, the electrodes, the electrically conductive elements, and the substrates of multi-layer stack 101 are implemented as layers. The viewing window can refer to a region of multi-layer stack 101 intended to be viewed by a viewer of multi-layer stack 101 (i.e., a region of interest). When redox element 102 is located inside of the viewing window, redox element 102 can remain substantially transparent before, when, and/or after the redox element 102 is selectively oxidized or reduced in the redox reaction. Meanwhile, when redox element 102 is located outside of the viewing window, redox element 102 can be located at a secondary portion (e.g., a perimeter portion) of multi-layer stack 101. The secondary portion of multi-layer stack 101 can refer to a portion of multi-layer stack 101 that is not intended for viewing by a viewer of multi-layer stack 101. In some cases, the secondary portion of multi-layer stack 101 can be omitted (i.e., all of multi-layer stack 101 can be intended for viewing). Further, the perimeter portion of multi-layer stack 101 can refer to a portion of multi-layer stack 101 demarcated between a perimeter edge of multi-layer stack 101 and a reference line inset from the perimeter edge of multi-layer stack 101 by a predetermined distance. The predetermined distances can be established, at least in part, according to the desired size of the viewing window. An exemplary predetermined distance can comprise 2.54 centimeters. The perimeter portion can partially or entirely surround (e.g., frame) the viewing window. The predetermined distance can be uniform or may vary, depending on the given embodiment.

FIG. 8 illustrates a top or bottom view of multi-layer stack 201 (FIG. 6) including an exemplary viewing window 314 and an exemplary secondary portion 315, according to the embodiment of FIG. 1. In these cases, viewing window 314 can be similar or identical to the viewing window described above with respect to electrochromic device 100, and secondary portion 315 can be similar or identical to the secondary portion described above with respect to electrochromic device 100. As illustrated at FIG. 8, secondary portion 315 can include a perimeter portion of multi-layer stack 201 (FIG. 6). For example, the sequestration material can be located within secondary portion 315 and is covered by a bezel or other marginal covering and, irrespective of whether it changes color upon a change in its oxidation state, will thus not impact the range of optical states of an electrochromic device incorporating multi-layer stack 201 over its useful life.

The projected area of the passive, active, or enhanced active redox element can be from a non-zero percent of the total device projected area to approximately 20% of the total device projected area. The projected area of the passive, active, or enhanced active redox element can be 5% of the total device projected area, or approximately 1% of the total device projected area, or approximately 0.5% of the total device projected area, or less than approximately 1% of the total device projected area, or less than approximately 2% of the total device projected area, or less than approximately 5% of the total device area, or less than approximately 10% of the total device projected area, or from 0.1% to 5% of the total device projected area, or from 0.1% to 0.5% of the total device projected area, or from 0.5% to 2% of the total device projected area, or from 1% to 5% of the total device projected area, or from 0.1% to 1% of the total device projected area, or from 0.1% to 10% of the total device projected area. The larger the passive, active, or enhanced active redox element, the faster it can absorb charge and sequester it from other layers of the multi-layer stack. However, for a product, it is desirable to have the primary area as large as possible, and the other areas as small as possible. For example, for a product that is an electrochromic window, the primary area is the area able to transmit light, and the other areas can include the window frame, control circuitry, and in some cases a redox element. In such examples, there is a trade-off between maximizing the primary area of the device and the capabilities of the passive, active, or enhanced active redox element to sequester charge. The placement and area of the passive, active, or enhanced active redox element is particularly important in cases where the redox element is not transmissive to light in some or all states, requiring that the redox element be obscured under the frame portion of the window.

An electrochromic device can include a redox element, and a first and second substrate, such that the area of the first and/or second substrates is greater than 10 cm$^2$, or greater than 100 cm$^2$, or greater than 200 cm$^2$, or greater than 300 cm$^2$, or greater than 400 cm$^2$, or greater than 500 cm$^2$, or greater than 1000 cm$^2$, or from 100 to 1000 cm$^2$, or from 200 to 1000 cm$^2$, or from 300 to 1000 cm$^2$, or from 500 to 1000 cm$^2$, or from 750 to 1000 cm$^2$. In some cases, the EC device has substrates with the aforementioned sizes, and the substrate material is glass, plastic or a polymeric material.

In some cases, an electrochromic device has a redox element, and a first and second electrically conductive layer, and the device area is approximately quadrilateral, and one bus bar is connected to each of the two electrically conductive layers in such a way that they are oriented along two opposing edges of the quadrilateral device. The redox elements can also be positioned along one side of one or both substrates, on the opposite side from, or adjacent side to, or on the same side as the bus bars on one or both substrates. The redox elements can also be located on more than one edge of one or both substrates, and are located on sides opposite from, adjacent to, or the same side as bus bars on one or both substrates. There can also be more than 2 redox elements, which are located on 1, 2, 3 or 4 sides of the quadrilateral, and on one or both substrates. The redox elements can also form an "L" shape, and span 2 adjacent sides of the quadrilateral. There can also be 1, 2, or more than 2 redox elements configured in different combinations described herein. For example, there may be 2 redox elements in "L" shapes, where each spans 2 adjacent sides of the quadrilateral, and are located on different substrates, plus 2 redox elements located along a single side, each one sharing the substrate with an "L" shaped redox element.

The four sides of the quadrilateral of the first substrate can be designated sides A, B, C and D, where sides A and B meet at a vertex, sides B and C meet at a vertex, sides C and D meet at a vertex, and sides D and A meet at a vertex of the first substrate, and the four sides of the quadrilateral of the second substrate are designated sides A', B', C' and D', wherein sides A' and B' meet at a vertex, sides B' and C' meet at a vertex, sides C' and D' meet at a vertex, and sides D' and A' meet at a vertex of the second substrate. The two substrates can be joined to form an electrochromic device, and the two substrates rotated such that sides A and A' are parallel and nearest to one another, sides B and B' are parallel and nearest to one another, sides C and C' are parallel and nearest to one another, and sides D and D' are parallel and nearest to one another. In such cases, the first bus bar may be located along edge A of the first substrate, and the second bus bar may be located along edge C' of the second substrate. There may also be one redox element located on side A, or B, or C, or D of the first substrate, or on side A', or B', or C', or D' of the second substrate. There may also be more than one redox element located on sides A, and/or B, and/or C, and/or D of the first substrate, and/or on sides A', and/or B', and/or C', and/or D' of the second substrate. There may also be more than 2 redox elements located on 1, 2, 3 or 4 sides of the quadrilateral, and on sides A, and/or B, and/or C, and/or D of the first substrate, and/or on sides A', and/or B', and/or C', and/or D' of the second substrate. The redox elements may also form an "L" shape, and span 2 adjacent sides of the quadrilateral, and be located on sides A and B, and/or B and C, and/or C and D, and/or D and A of the first substrate, and/or on sides A' and B', and/or B' and C', and/or C' and D', and/or D' and A' of the second substrate. There may also be 1, 2, or more than 2 redox elements configured in different combinations described herein. For example, there may be 2 redox elements in "L" shapes, where each spans 2 adjacent sides of the quadrilateral, and are located on different substrates (e.g., sides A and B, and/or B and C, and/or C and D, and/or D and A of the first substrate, and on sides A' and B', and/or B' and C', and/or C' and D', and/or D' and A' of the second substrate), plus 2 redox elements located along a single side, each one sharing the substrate with an "L" shaped redox element (e.g., side A, or B, or C, or D of the first substrate, and side A', or B', or C', or D' of the second substrate).

Drive Schemes for Electrochromic Devices with Redox Elements

The control circuitry described in this section are all embodiments, and should be understood to be illustrative as possible embodiments, not as limiting examples.

A driver for electrochromic devices such as electrochromic glass can charge and discharge an electrochromic device reliably, repeatably, and without exceeding safe operating limits for the device. Voltage and current are generally applied to the bus bars of the electrochromic device connected to the electrically conductive layers of the multi-layer stack. Additionally, in some embodiments of the electrochromic device, a charge sequestration terminal is available to sequester the excess charge, for instance caused by spurious oxidation or reduction. Various embodiments may have multiple power supplies or a single, more complex power supply, and have analog or digital components for determining charge transfer and controlling the power supply or supplies.

In some cases, multi-layer stack 101 and redox element 102 are configured to receive electrical potentials (i.e., separate electrical potentials) independently of each other, such as, for example, both from electric power supply 103 or from electric power supply 103 and a second (e.g., independent) electric power supply, determining when the electrical potential is applied to redox element 102 by the external circuitry. The applied potentials can be managed using any suitable techniques configured to establish and/or maintain, as desired, the operating electrical potential range of multi-layer stack 101, the open-circuit electrical potentials corresponding to one or more of the states of charge of multi-layer stack 101, and/or the range of the states of charge of multi-layer stack 101 corresponding to the optically transmissive states from the optically less transmissive state to the optically more transmissive state. Data analysis and control electronics (not shown) can also be implemented to manage when the electrical potential is applied to redox element 102. In some cases, the amount of charge sequestered by the redox element can also be monitored. In these or other embodiments, electrochromic device 100 can comprise the data analysis and control electronics.

The data analysis and control electronics can apply a scheme to manage when the electrical potential is applied to redox element 102. Under some exemplary schemes, first the multi-layer stack 101 can be cycled from an optically more transmissive state to an optically less transmissive state by applying a constant supply current to the electrochromic device and determining an amount of charge transferred to the electrochromic device, as a function of time and current supplied to the electrochromic device. The constant supply current can cease, responsive to a sense voltage reaching a sense voltage limit and one of a variable voltage or a variable current can be applied to the electrochromic device to maintain the sense voltage at the sense voltage limit, responsive to the sense voltage reaching the sense voltage limit. The variable voltage or the variable current application to the electrochromic device be terminated, responsive to the determined amount of charge reaching a target amount of charge. In some cases voltage and current application cease when the amount of charge transferred to the electrochromic device meets a target amount of charge, at which time the electrochromic device is at a target level of transmissivity. Other schemes based on time duration, and other parameters are also possible.

More details regarding drivers for electrochromic devices with redox elements, and methods of controlling electrochromic devices with redox elements can be found in the patent application titled "Driver for Electrochromic Device and Related Methods" having the provisional application No. 62/102,504, and is incorporated herein by reference.

In some cases, there may be 2 or more electrically isolated redox elements and the principles of the control circuitry would be the same, however, there would be multiple auxiliary electrodes, with independently controllable circuits. Each independent redox element could have a separate input to the driver, along with the associated circuit elements necessary to independently control each redox element. In this way some or all of the redox elements could be put into sequestration mode at the same time, or staggered to sequester charge at different times.

Sequestration can occur periodically to correct for undesired faradaic losses in the electrochromic device. In different cases, the length of time between sequestration cycles is from 1 minute to 48 hours, or from 2 to 4 hours, or from 4 to 6 hours, or from 6 to 12 hours, or from 12 to 24 hours, or from 1 to 2 days, or from 2 days to 7 days, or from 1 week to 1 month. These lengths of time between sequestration cycles may vary depending on the size, design, number of redox elements, chemistry of the device, materials comprising the multi-layer stack (e.g. anode, cathode, ion conductor), materials comprising the redox element, the thickness and/or volume of the ion conductor, the ion conductivity of the ion conductor, the ion diffusivity of the ion conductor, and the environmental conditions (e.g. the temperature of the device).

The length of time between sequestration cycles can also be related to the spurious charge built up in the anode, or cathode, or both. In this case, the charge on the electrode can be monitored by the control circuitry and the sequestration cycle started when a certain charge condition is reached on the multi-layer stack, or the anode, or the cathode, or both, for a given condition (e.g. bleached) of the multi-layer stack. In some cases, the sequestration can be initiated based upon the open circuit voltage between the electrically conductive layers, measured when the device is in a particular state.

In other cases, the length of time between sequestration cycles can be related to the number of switching cycles of the multi-layer stack between more transmissive and less transmissive states. In this case, the sequestration cycle would be triggered to begin after a certain number of switching cycles. The number of switching cycles triggering sequestration can be 0.5, 1, 2, 3, 4, 5, 6, 7, 8, 9, 10, from 0.5 to 10, from 1 to 10, from 10 to 100, from 5 to 20, or from 0.5 to 100, or less than 10, or less than 5, or less than 2.

The duration of the sequestration can vary from 1 to 1000, from 5 to 500, from 5 to 50, from 1 to 10, or from 1 to 100 minutes. The length of time depends on many factors, including but not limited to, the time between sequestration cycles, the rate of spurious oxidation and/or reduction, the size of the redox element and the materials comprising the ion conductor and the redox element.

In some cases, during the sequestration, when current and/or voltage is applied to the auxiliary electrode of the redox element, the preferred state of the multi-layer stack will be in the open circuit in the bleached (more transmissive) state. In some cases, it is advantageous to sequester charge is when the device is in the bleached state because in the fully bleaches state there is excess charge in the cathode only. In such cases, in any other state, the charge in the anode/cathode will be a mix of excess charge and charge initially present in the device. In such cases, it is also possible to sequester in other states, but that may require carefully counting charge to know exactly how much excess charge is needed to be sequestered. In these other cases the sequestration would be performed to a specific charge limit. However, in the fully bleached state, excess charge is only in the cathode and sequestration can proceed until the current goes to zero and the excess charge present in the cathode is completely moved to the auxiliary electrode. In that case the amount of excess charge sequestered does not need to be quantified.

In some cases, the sequestration could be performed every time the window is switched into the more transmissive (bleached) state. Alternatively, the sequestration could be performed after every 2 times the window is switched into the bleached state, or after every 3 times the window is switched into the bleached state, or every 4 times the window is switched into the bleached state, or after from 5 to 10 times the window is switched into the bleached state, though it should be understood that the periodicity of the sequestration can vary based on the device size, design, number of redox elements, chemistry of the device, materials comprising the multi-layer stack (e.g. anode, cathode, ion conductor) materials comprising the redox element, the thickness and/or volume of the ion conductor, the ion conductivity of the ion conductor, the ion diffusivity of the ion conductor, and the environmental conditions (e.g. the temperature of the device).

In some cases, the sequestration would not begin until the multi-layer stack was in a sufficiently bleached state. In some cases, the device could be monitored to ensure that the device is in a sufficiently bleached state before sequestration. This could be accomplished by waiting some amount of time after the device is switched into the bleached state before sequestration is begun. In some embodiments this delay time could be 1 minute, 5 minutes, 10 minutes, 20 minutes, 40 minutes, 1 hour, 2 hours, 3 hours, 4 hours, or from 5-12 hours. Of course, the delay time may be different depending on the device size, design, number of redox elements, chemistry of the device, materials comprising the multi-layer stack (e.g. anode, cathode, ion conductor) materials comprising the redox element, the thickness and/or volume of the ion conductor, the ion conductivity of the ion conductor, the ion diffusivity of the ion conductor, and the environmental conditions (e.g. the temperature of the device). There may also be other methods to ensure that the multi-layer stack is in a sufficiently bleached state, sensing the potentials, currents or charge on different electrodes, using active feedback, and/or using preset applied bias, applied current or injected charge algorithms.

In some cases, multiple conditions would have to be met for sequestration to begin. These multiple conditions could be the combination of being sufficiently bleached, and when the incident solar radiation is below some threshold. The incident solar radiation could be directly measured, or could be approximated by a certain range of times of day at certain times of the year in a certain known location. In some cases, the sequestration would begin only when the light incident on the device is below some threshold.

It may be desirable to maintain a low potential within the device during sequestration. In some cases low potential during sequestration may mitigate degradation in the presence of incident radiation. This could be accomplished by applying a constant current during sequestration, with a potential limit programmed between all of the device electrodes, including between the auxiliary electrode and the electrically conductive layers, and between the first and second electrically conductive layers.

EXAMPLES

The following non-limiting examples are provided to further illustrate the present disclosure. It should be appreciated by those of skill in the art that the techniques disclosed in the examples that follow represent approaches the inventors have found function well in the practice of the disclosure, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the disclosure.

Example 1

IGU, Frame, Bite

In one non-limiting example, an electrochromic device has two enhanced active redox elements. The device has two rectangular glass substrates, each approximately 75 cm wide and 130 cm long. Both substrates have a fluorine-doped tin oxide (FTO) transparent electrically conductive layer coating with a sheet resistance of approximately 15 Ohms/square. One substrate has an electrochromic anode electrode layer, and the other substrate has an electrochromic cathode electrode layer, on the electrically conductive layers. The anode and cathode electrodes are patterned with laser ablation to electrically isolate areas where the redox elements will be connected. One bus bar is connected to the electrically conductive layer connected to the anode along the long edge (length) of one substrate, and the other bus bar is connected to the electrically conductive layer connected to the cathode along the opposite long edge (length) on the other substrate. The auxiliary electrodes of the redox elements are formed from the FTO material on the substrate connected to the cathode by ablating away FTO material to form two elongated isolated FTO rectangles along the short edges (widths) of the substrate near the edges of the device. The dimensions of each of the auxiliary electrode isolated rectangles is approximately 70 cm×1.5 cm, and each is therefore approximately 1% of the device projected area. The sequestration material of the enhanced active redox elements is connected to the auxiliary electrodes inside of the isolated regions, without making connection to the rest of the FTO layer. The device includes an ion conductor material between the electrodes, and a seal around the circumference of the device protecting the interior materials of the device. In the assembled device, the bus bars are connected to the electrically conductive layers on the two substrates, and wiring connection exit points penetrate the seal to connect the bus bars to external control circuitry. The wiring connection exit points from the device are located along one of the short edges (widths) of the assembled device, and therefore one of the auxiliary electrodes can be directly connected to the wiring connection near the exit point. The other auxiliary electrode, that is on the opposite side of the device from the wiring connection exit points, is patterned such that there is an FTO channel connecting it to a location near the wiring exit point. This FTO channel is connected to the one auxiliary electrode on the edge opposite the wiring connection exit points, and is also isolated from the rest of the FTO layer, bus bars, and other auxiliary electrode. The wiring connection exit points provide multiple independent connections to the electrodes and the auxiliary electrodes so that the device can be switched, and either or both of the redox elements can be independently used for sequestration.

Example 2

EC Device with Passive Redox Element

Figure 10A:
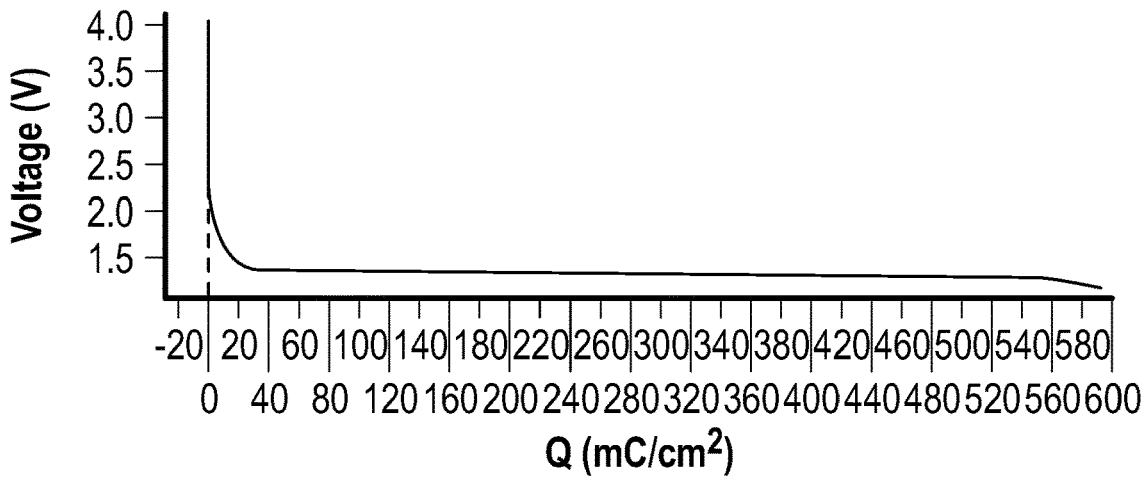
FIG. 10a is a graph of the cell potential (Voltage (V)) versus charge capacity per unit area (Q ($mC/cm^2$)) for an electrochromic device of the present invention.
Figure 10B:
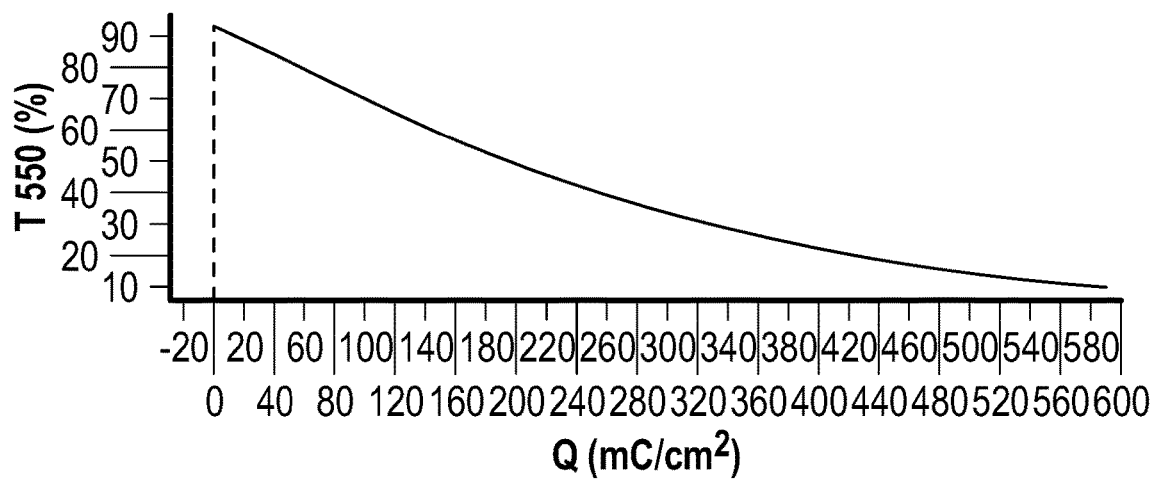
FIG. 10b is a graph of the optical transmission at 550 nm (T 550(%)) versus charge capacity per unit area (Q ($mC/cm^2$)) for an electrochromic device of the present invention.

FIGS. 10a and 10b illustrate electrical and optical properties of an exemplary sequestration material, diantimony pentoxide ($Sb_2O_5$), in a passive redox element. In this example a half cell with FTO coated glass and the $Sb_2O_5$ sequestration material is used, with a Li counter and reference electrode. The diantimony pentoxide sequestration material of the passive redox element is prepared by spin coating a colloidal nanoparticle solution onto Pilkington TEC 15 Glass™ and thermally treating the solution to 415° C. for 10 minutes. FIG. 10a is a graph of the charge capacity per unit area (Q ($mC/cm^2$)), showing charge sequestration beginning at a voltage below approximately 2.5 V, with a plateau at approximately 1.5 V. In this example, sequestration is run until approximately 600 $mC/cm^2$ is sequestered from the counter electrode. FIG. 10b illustrates a graph of the optical transmission of the half cell, as the charge is sequestered from the counter electrode, for electromagnetic radiation having a wavelength of 550 nanometers. As the charge is sequestered the $Sb_2O_5$ material is reduced, and the transmission of the half cell drops from approximately 90% to approximately 10%.

This example shows that a sequestration material in a passive redox element can be effective for sequestration in a full electrochromic device, particularly when the reduction potential is below the reduction potential of the anode in the full device.

Example 3

EC Device with Active Redox Element

In one non-limiting example, the redox element is a single material, which is the same material as one or both of the electrically conductive layers. In this example, the redox element is easily manufactured via laser scribing. In this example, the electrically conductive layer is deposited on the substrate, then the area designated for the redox element is isolated from the rest of the film via laser scribing. The laser scribe electrically isolates the area designated for the redox element from the electrically conductive layer by ablating material to create a high resistance between the redox element area and the electrically conductive layer area. Then the electrode layer is deposited by selective area deposition methods on the whole substrate except over the redox element. In this case, the electrode is deposited with slot die coating using shims to define an area where the layer is deposited. It is important to not coat the electrode over the redox element, in order to keep the redox element isolated from the electrically conductive layers and electrode. In this example, the electrode is deposited on the electrically conductive layer, and not on the area designated for the redox element. Separate electrodes are then connected to the electrically conductive layer and the auxiliary electrode of the redox element using different bus bars, in order to bias the electrically conductive layer and the auxiliary electrode separately through the control circuitry.

The resulting device has the attribute that the redox element is electrically isolated from the electrically conductive layer and the electrode layer, but is in ionic communication with the electrically conductive layer and the electrode layer through the ion conductor layer. The charge is then sequestered from the multi-layer stack into the redox element through the ion conductor layer, controlled by the external circuitry.

The window in this example is approximately 1335 mm tall and 825 mm wide. The redox element borders two sides of the window, and forms a strip approximately 7 mm wide. The area of the redox element in this example is therefore approximately 1% of the area of the window.

Laser scribing parameters for this example are a 1064 nm wavelength Nd:YAG laser is utilized, with average power 16 W, scan rate 500 mm/s, pulse width 50 ns, repetition rate 25 kHz, and beam width 60 microns.

Figure 11:
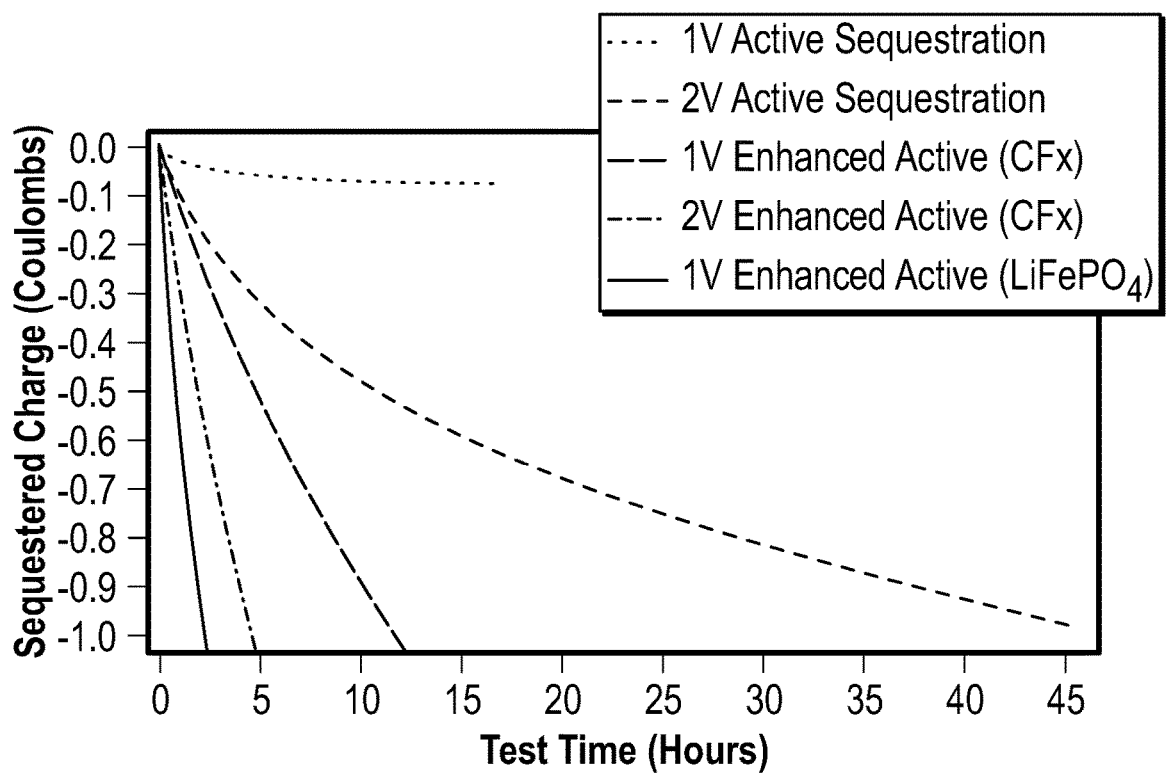
FIG. 11 is a graph of sequestered charge (Q (C)) versus time in hours (test time h) for electrochromic devices of the present invention.

FIG. 11 shows device data from electrochromic devices with active and enhanced active redox elements. The devices in this example are 6"×6" devices with a $WO_3$ cathode, an IC, and a LiNiO anode. The auxiliary electrode is formed from an electrically isolated FTO region. In all devices in this example, the initial state of the cathode is lithiated such that it is reduced and dark (low transmission). FIG. 11 plots sequestered charge (Q (C)) on the y-axis and test time of a constant applied voltage (test time (h)) on the x-axis. The two curves labeled "Active sequestration 1 V" and "Active sequestration 2 V" are active sequestration examples, where an FTO auxiliary electrode is used to sequester charge from the lithiated $WO_3$ cathode. When a constant voltage of 1 V is applied ("Active sequestration 1 V") very little charge is sequestered, approximately −0.1 C over more than 15 h of applied voltage. When a constant voltage of 2 V is applied ("Active sequestration 2 V") the charge is more readily sequestered from the lithiated cathode, and nearly −1.0 C is sequestered over roughly 45 h of applied voltage.

This example shows that an active redox element can be effective for sequestration in a full electrochromic device, by sequestering charge from one of the electrodes directly into the auxiliary electrode material.

Example 4

EC Device with Enhanced Active Redox Element

FIG. 11 shows device data from electrochromic devices with active and enhanced active redox elements. The devices in this example are 6"×6" devices with a $WO_3$ cathode, an IC, and a LiNO anode. The auxiliary electrode is formed from an electrically isolated FTO region. In all devices in this example, the initial state of the cathode is lithiated such that it is reduced and dark (low transmission). FIG. 11 plots sequestered charge (Q (C)) on the y-axis and test time of a constant applied voltage (test time (h)) on the x-axis. There is data from three enhanced active sequestration devices in FIG. 11, which all have an auxiliary electrode formed from FTO, and a sequestration material in electrical communication with the auxiliary electrode. As is required for an enhanced active redox element, the auxiliary electrode and sequestration material are both electrically isolated from the electrodes and electrically conductive layers of the devices. Two of the devices utilize $CF_x$ as the sequestration material, and one of the devices has a $LiFePO_4$ sequestration material.

All three of the enhanced active devices sequester more charge from the cathode in a shorter amount of time than the active sequestration device examples, at both 1 V and 2 V applied voltage. The devices with the $CF_x$ sequestration material sequesters −1.0 C in approximately 12 h with a 1 V applied bias, and −1.0 C after approximately 5 h with a 2 V applied bias. The devices with the $LiFePO_4$ sequestration material sequesters −1.0 C in approximately 2.5 h with a 1 V applied bias.

FIG. 11 shows that active sequestration is effective to remove charge from an electrode in an electrochromic device. Additionally, FIG. 11 shows that using a suitable sequestration material in conjunction with an auxiliary electrode enables the sequestration of more charge in a shorter amount of time than if an auxiliary electrode were used alone.

Example 5

EC Device with Organic Redox Element

Figure 12:
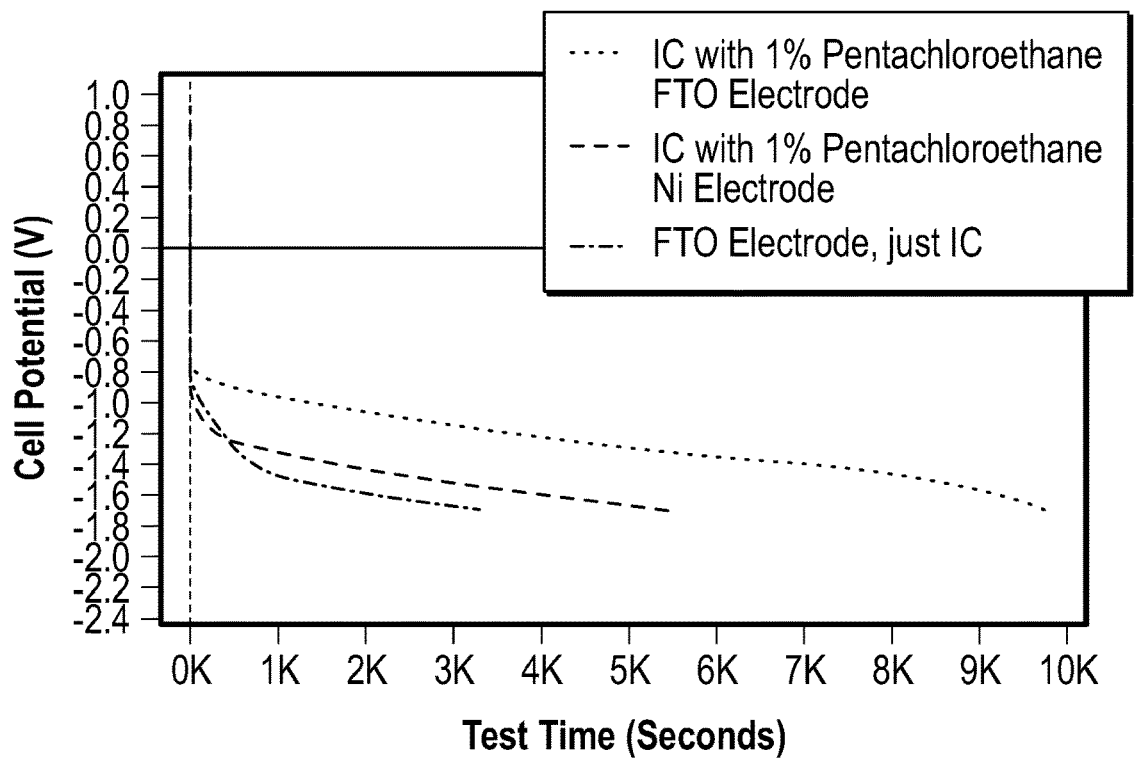
FIG. 12 is a graph of cell potential (V V) versus time in seconds (Step Time S) for electrochromic devices of the present invention.
Figure 13:
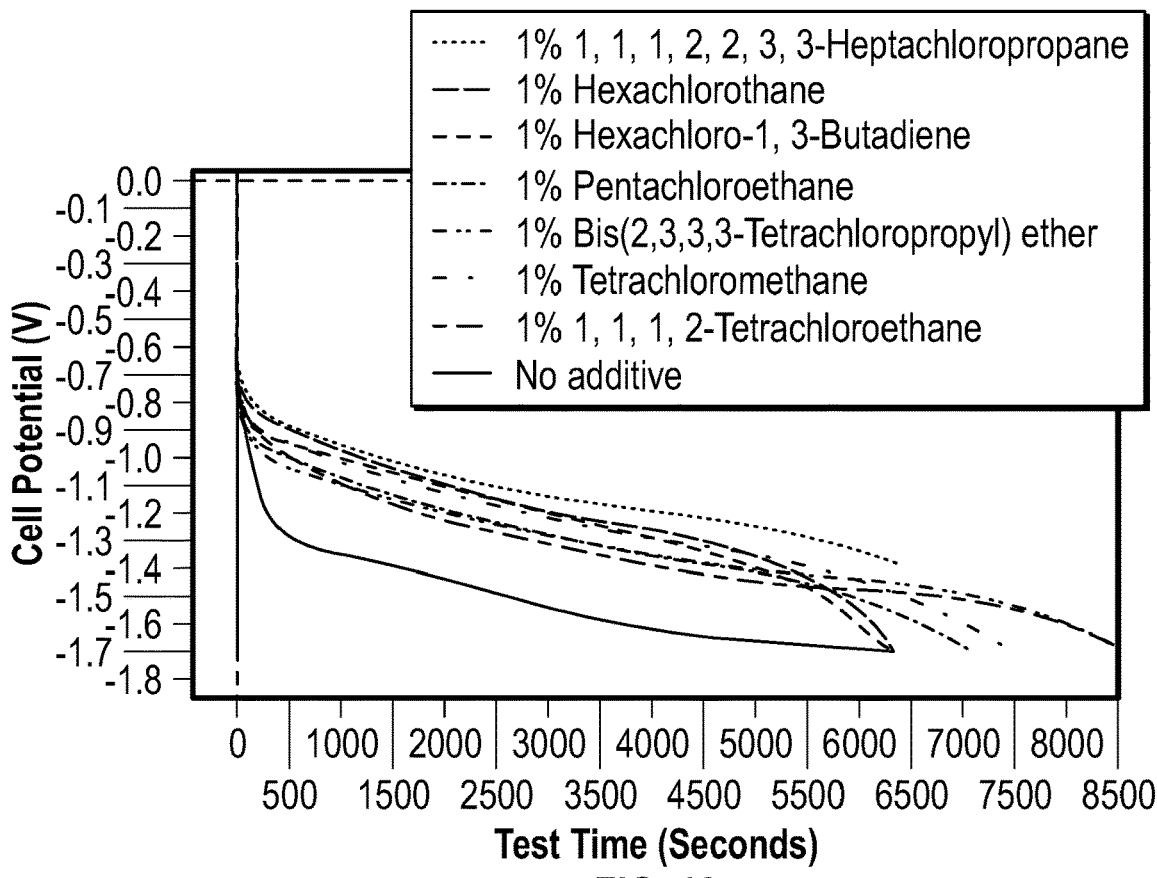
FIG. 13 is a graph of cell potential (V V) versus time in seconds (Test Time s) for electrochromic devices of the present invention.

FIGS. 12 and 13 show data from electrochromic devices with organic sequestration elements. The devices in these two figures are 20 mm×20 mm devices with a $WO_3$ cathode, an IC, and a counter electrode. In some of the devices the counter electrode is ITO or FTO, and in some devices it is LiNiO coated on FTO. In all devices, the initial state of the cathode is lithiated such that it is reduced and dark (low transmission). The LiNiO anodes, when present, cover the entire TCO. None of the devices in this example (or in FIG. 12 or 13) have an auxiliary electrode. Some of the data in FIGS. 12 and 13 come from devices with organic sequestration elements, in the form of organic molecules in the IC.

The data in FIGS. 12 and 13 is obtained by applying a constant current (−5 μA) and measuring the cell voltage as a function of time. The y-axis in the figure is the cell voltage (in volts), and the x-axis is time (in seconds). Applying a constant current over time is equivalent to injecting charge into the device. The polarity of the applied current will oxidize the cathode and drive the cell to more negative cell voltages. The tests are stopped when the cell voltage reaches approximately −1.7 V.

FIG. 12 shows data from three different devices. The $WO_3$ cathodes in the devices in FIG. 12 are all initially reduced. The 'FTO electrode, just IC' device has no organic sequestration element. The 'Ni electrode' and 'FTO electrode' devices have an IC with 1 wt. % pentachloroethane, which is an organic sequestration element. The 'FTO electrode' device with the organic sequestration element has a less negative voltage at any given time in the experiment, than the device without the organic sequestration element. In other words, the cathode in the 'FTO device' with the organic sequestration element is oxidized by the organic sequestration element at less negative cell voltages than possible without the organic sequestration element. This is indicative of the half-reaction of the reduction of the organic sequestration molecule occurring at a less negative potential (beginning at roughly −0.8 V) compared to the reduction half-reaction within the device without the organic sequestration element (beginning at roughly −1.2 V). The 'FTO electrode' device with the active sequestration element required almost 10,000 seconds of constant current application to reach −1.7 V, while the device without the organic sequestration element required only about 3,000 seconds on constant current to reach −1.7 V.

The 'Ni electrode' device has an organic sequestration element, however, also requires more negative potential to oxidize the cathode (beginning at roughly −1.0 to −1.4 V). This indicates that the pentachloroethane is not an effective organic sequestration element in the device with the LiNiO anode, since it does not effectively reduce at the LiNiO IC interface. The 'Ni electrode' device with the active sequestration element required about 5,500 seconds of constant current application to reach −1.7 V.

FIG. 13 shows data for seven different organic sequestration elements in seven different devices, and one device with no organic sequestration element. All devices in this example have a $WO_3$ cathode and ITO as the counter electrode, and the cathode is initially reduced (lithiated) and dark. The organic sequestration elements are 1% 1,1,2,2-tetrachloroethane, 1% pentachloroethane, 1% hexachloroethane, 1% 1,1,1,2,2,3,3-heptachloropropane, 1% Hexachloro-1,3-butadiene, 1% tetrachloromethane, and 1% Bis(2,3,3,3-tetrachloropropyl) ether. All three devices with the organic sequestration elements have less negative voltages at any given time in the experiment, than the device without the organic sequestration element. In other words, the cathode in the devices with the organic sequestration element is oxidized by the organic sequestration element at less negative cell voltages than possible without the organic sequestration element. The organic sequestration materials are correspondingly reduced in this process. This data illustrates that the half-reactions of the reduction of the organic sequestration molecules occur at a less negative potential (beginning at roughly −0.8 to −1.0 V) compared to the reduction half-reaction within the device without the organic sequestration element (beginning at roughly −1.0 to −1.4 V). The 1,1,2,2-tetrachloroethane and pentachloroethane devices required between 9,000 and 10,000 seconds of constant current application to reach −1.7 V, and the hexachloroethane device required about 7,000 seconds constant current application to reach −1.7 V, while the device without the organic sequestration element required only about 3,000 seconds on constant current to reach −1.7 V.

The data in this example illustrates that organic sequestration is effective to remove charge from an electrode in an electrochromic device, and that there are numerous organic sequestration materials that can be effective. Additionally, FIG. 12 shows that in some cases an organic sequestration material can be effective when certain materials are used for the counter electrode, but not as effective when different materials are used as the counter electrode for the sequestration reaction.

Example 6

Prussian Blue/Tungsten Trioxide EC Device with Redox Element to Match Initial Optical States An example of an electrochromic (EC) device that can benefit from a redox element to match the initial states of the layers is a Prussian blue (PB)/tungsten trioxide ($WO_3$) EC device.

Figure 14:
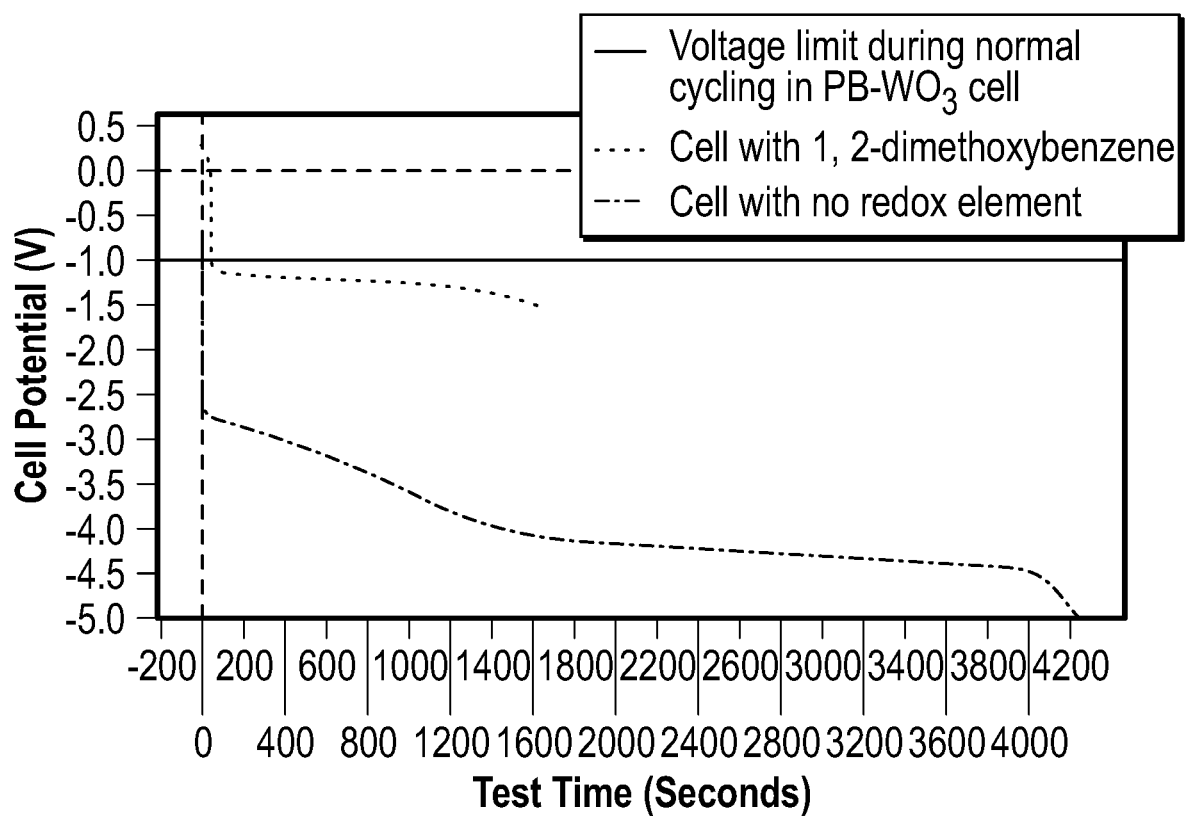
FIG. 14 is a graph of cell potential (V V) versus time in seconds (Step Time S) for electrochromic devices of the present invention.

FIG. 14 illustrates the potential developed in two PB/$WO_3$ devices under constant current load, where one of the test structures has an organic sequestration element and the other does not. The y-axis is a measured potential (in Volts) across the electrochromic device, and the x-axis is time (in seconds) of a constant applied current (−0.005 mA). The cell potential vs. time of the PB/$WO_3$ electrochromic device with no redox element is shown in the blue curve. The cell potential plateaus between about −2.5 to −5 V, which is indicative of the oxidation of one of the materials in the device. In many cases this oxidation is irreversible, and represents a permanent degradation of one or more of the materials in the device. However, the PB/$WO_3$ electrochromic cell with a redox element containing 1,2-dimethoxybenzene organic sequestration material develops a less negative potential plateau of about −1.2 to −1.5 V. This is indicative that the organic sequestration material is oxidizing at about −1.2 to −1.5 V, a potential range significantly more positive the potential range of the cell with no redox element. Furthermore, the voltage limit during normal cycling in the PB/$WO_3$ cell is −1.0 V (as shown in FIG. 14). This data illustrates that the addition of 1,2-dimethoxybenzene enables the reduction of PB at a potential outside of the normal operating range of the cell, but at a potential magnitude significantly smaller than that which would cause other materials in the cell to degrade (i.e. −2.5 to −5 V).

According to the literature, the redox potential of 1,2-dimethoxybenzene is 4.0 V for a first ionization step and 4.4 V for a second ionization step (converted to a Li/Li+ potential). [Buhrmester et al., Journal of The Electrochemical Society, 152 (12) A2390-A2399 (2005)]

What is claimed is:

1. An electrochromic multi-layer stack comprising:
   a first substrate;
   a first electrically conductive layer arranged on the first substrate;
   a first electrode layer arranged on the first electrically conductive layer;
   a second substrate;
   a second electrically conductive layer arranged on the second substrate;
   a second electrode layer arranged on the second electrically conductive layer; and
   an ion conductor layer arranged between the first and second electrode layers and in ionic communication with both the first and second electrode layers;
   wherein:
      the ion conductor layer comprises an organic redox element;
      the organic redox element comprises an organic sequestration material; and
      reduction of the organic sequestration material occurs at a less negative potential compared to reduction half-reactions of the multi-layer stack without the organic redox element, or oxidation of the organic sequestration material occurs at a more positive potential compared to oxidation half-reactions of the multi-layer stack without the organic redox element.

2. The electrochromic multi-layer stack of claim 1, wherein the organic sequestration material is selected from the group consisting of 1,1,2,2-tetrachloroethane, pentachloroethane, hexachloroethane, 1,1,1,2,2,3,3-heptachloropropane, hexachloro-1,3-butadiene, tetrachloromethane, and bis(2,3,3,3-tetrachloropropyl) ether.

3. The electrochromic multi-layer stack of claim 1, wherein:
   the first electrode layer comprises a nickel metal oxide;
   the second electrode layer comprises a tungsten metal oxide; and
   the reduction of the organic sequestration material occurs at a less negative potential compared to reduction half-reactions of the multi-layer stack without the organic redox element.

4. The electrochromic multi-layer stack of claim 3, wherein the organic sequestration material is selected from the group consisting of n-haloalkanes, cyclic-haloalkanes, cyclic-haloalkenes, n-haloalkenes, haloethers, haloacetones, haloketones, haloesters, halocarbonates, and halophosphates.

5. The electrochromic multi-layer stack of claim 3, wherein the reduction of the organic sequestration material occurs at a potential from −0.8 V to −1.0 V, and the reduction half-reactions of the multi-layer stack without the organic redox element begin at a potential from −1.0 V to −1.4 V.

6. The electrochromic multi-layer stack of claim 1, wherein:
   the first electrode layer comprises Prussian blue;
   the second electrode layer comprises a tungsten metal oxide; and
   the oxidation of the organic sequestration material occurs at a more positive potential compared to oxidation half-reactions of the multi-layer stack without the organic redox element.

7. The electrochromic multi-layer stack of claim 6, wherein the organic sequestration material is selected from the group consisting of dimethoxybenzene derivatives, benzene derivatives, and anisole derivatives.

8. The electrochromic multi-layer stack of claim 1, wherein the ion conductor layer comprises a polymer material.

9. The electrochromic multi-layer stack of claim 1, wherein:
the ion conductor layer is deposited using solution coating from a precursor solution; and
the precursor solution comprises the organic sequestration material.

10. The electrochromic multi-layer stack of claim 1, wherein the ion conductor layer is in ionic communication with the first and second electrode layers, and with the first electrically conductive layer.

11. The electrochromic multi-layer stack of claim 1, further comprising a second redox element comprising a second sequestration material and an auxiliary electrode material, wherein the second redox element is electrically isolated from the first and second electrically conductive layers and the first and second electrode layers.

12. The electrochromic multi-layer stack of claim 11, wherein the second redox element is laterally adjacent to either the first electrically conductive layer and the first electrode layer, or the second electrically conductive layer and the second electrode layer.

13. The electrochromic multi-layer stack of claim 11, wherein the auxiliary electrode comprises the same material as the first or second electrically conductive layer.

14. The electrochromic multi-layer stack of claim 11, wherein the second sequestration material is selected from the group consisting of a fluorocarbon, $CF_x$ where x is from 0.95 to 1.15, a sulfide, an oxide, a fluorosulfate, a phosphate, lithium iron phosphate, a metal, a metal alloy, or a polymer.

15. The electrochromic multi-layer stack of claim 11, wherein the second sequestration material is from 2 to 20 times thicker than either the first electrode layer or the second electrode layer.

16. The electrochromic multi-layer stack of claim 1, wherein the first electrically conductive layer, or the second electrically conductive layer, or both the first and the second electrically conductive layers have spatially varying properties.

17. The electrochromic multi-layer stack of claim 16, wherein the first electrically conductive layer, or the second electrically conductive layer, or both the first and the second electrically conductive layers comprise an ablated pattern and a non-linear resistance as a function of distance.

18. The electrochromic multi-layer stack of claim 1, wherein the multi-layer stack is incorporated in an electrochromic device comprising a more optically transmissive state and a less optically transmissive state, and the photopic transmittance ratio of the more optically transmissive state to the less optically transmissive state is from 5:1 to 30:1.

19. The electrochromic multi-layer stack of claim 1, wherein the multi-layer stack is incorporated in an electrochromic device that is implemented as an insulated glass unit (IGU).

20. The electrochromic multi-layer stack of claim 1, wherein the multi-layer stack is incorporated in an electrochromic device that is implemented as an architectural window.

* * * * *